(12) United States Patent
Sayana et al.

(10) Patent No.: US 9,401,750 B2
(45) Date of Patent: *Jul. 26, 2016

(54) METHOD AND PRECODER INFORMATION FEEDBACK IN MULTI-ANTENNA WIRELESS COMMUNICATION SYSTEMS

(71) Applicant: Google Technology Holdings LLC, Mountain View, CA (US)

(72) Inventors: Krishna Kamal Sayana, Arlington Heights, IL (US); Xiangyang Zhuang, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,738

(22) Filed: Nov. 25, 2015

(65) Prior Publication Data

US 2016/0080053 A1 Mar. 17, 2016

Related U.S. Application Data

(63) Continuation of application No. 13/924,838, filed on Jun. 24, 2013, now Pat. No. 9,203,489, which is a continuation of application No. 13/088,237, filed on Apr. 15, 2011, now Pat. No. 8,509,338.

(60) Provisional application No. 61/331,818, filed on May 5, 2010.

(51) Int. Cl.
*H04B 7/04* (2006.01)
*H04B 7/06* (2006.01)

(52) U.S. Cl.
CPC ............ *H04B 7/0456* (2013.01); *H04B 7/0469* (2013.01); *H04B 7/0478* (2013.01); *H04B 7/0486* (2013.01); *H04B 7/0639* (2013.01)

(58) Field of Classification Search
CPC ............... H04B 7/0456; H04B 7/0478; H04L 2025/03426
USPC ......................................................... 375/267
See application file for complete search history.

(56) References Cited

U.S. PATENT DOCUMENTS

| | | | |
|---|---|---|---|
| 4,612,669 | A | 9/1986 | Nossen |
| 4,631,543 | A | 12/1986 | Brodeur |

(Continued)

FOREIGN PATENT DOCUMENTS

| | | |
|---|---|---|
| CN | 1762137 | 4/2006 |
| CN | 1859656 | 11/2006 |

(Continued)

OTHER PUBLICATIONS

"3rd Generation Partnership Project; Technical Specification Group Radio Access Network", 3GPP TR 36.814 V9.0.0 (Mar. 2010), Further Advancements for E-UTRA Physical Layer Aspects (Release 9), Mar. 2010, 104 pages.

(Continued)

*Primary Examiner* — Michael Neff
(74) *Attorney, Agent, or Firm* — Wolfe-SBMC

(57) ABSTRACT

A method for two component feedback in wireless communication systems is disclosed, with a wireless communication device sending a first representation of a first matrix chosen from a first codebook, wherein the first matrix has at least two columns, the wireless communication device sending a second representation of a second matrix chosen from a second codebook, and the base station obtaining a precoder from the first representation and the second representation.

31 Claims, 6 Drawing Sheets

(56) References Cited

U.S. PATENT DOCUMENTS

| | | |
|---|---|---|
| 4,754,285 A | 6/1988 | Robitaille |
| 4,881,123 A | 11/1989 | Chapple |
| 4,884,252 A | 11/1989 | Teodoridis et al. |
| 5,267,234 A | 11/1993 | Harrison |
| 5,459,440 A | 10/1995 | Claridge et al. |
| 5,564,086 A | 10/1996 | Cygan et al. |
| 5,634,200 A | 5/1997 | Kitakubo et al. |
| 5,649,307 A | 7/1997 | Patino |
| 5,699,319 A | 12/1997 | Skrivervik |
| 5,757,326 A | 5/1998 | Koyama et al. |
| 5,804,944 A | 9/1998 | Alberkrack et al. |
| 5,862,458 A | 1/1999 | Ishii |
| 6,144,186 A | 11/2000 | Thandiwe et al. |
| 6,339,758 B1 | 1/2002 | Kanazawa et al. |
| 6,362,690 B1 | 3/2002 | Tichauer |
| 6,373,439 B1 | 4/2002 | Zurcher et al. |
| 6,400,702 B1 | 6/2002 | Meier |
| 6,560,444 B1 | 5/2003 | Imberg |
| 6,594,508 B1 | 7/2003 | Ketonen |
| 6,674,291 B1 | 1/2004 | Barber et al. |
| 6,879,942 B1 | 4/2005 | Nagase et al. |
| 6,927,555 B2 | 8/2005 | Johnson |
| 6,937,980 B2 | 8/2005 | Krasny et al. |
| 7,019,702 B2 | 3/2006 | Henriet et al. |
| 7,142,884 B2 | 11/2006 | Hagn |
| 7,199,754 B2 | 4/2007 | Krumm et al. |
| 7,202,815 B2 | 4/2007 | Swope et al. |
| 7,224,992 B2 | 5/2007 | Patino et al. |
| 7,254,420 B1 | 8/2007 | Klein |
| 7,260,366 B2 | 8/2007 | Lee et al. |
| 7,359,504 B1 | 4/2008 | Reuss et al. |
| 7,400,907 B2 | 7/2008 | Jin et al. |
| 7,433,661 B2 | 10/2008 | Kogiantis et al. |
| 7,436,896 B2 | 10/2008 | Hottinen et al. |
| 7,440,731 B2 | 10/2008 | Staudinger et al. |
| 7,471,963 B2 | 12/2008 | Kim et al. |
| 7,486,931 B2 | 2/2009 | Cho et al. |
| 7,504,833 B1 | 3/2009 | Sequine |
| 7,599,420 B2 | 10/2009 | Forenza et al. |
| 7,620,432 B2 | 11/2009 | Willins et al. |
| D606,958 S | 12/2009 | Knoppert et al. |
| 7,639,660 B2 | 12/2009 | Kim et al. |
| 7,643,642 B2 | 1/2010 | Patino et al. |
| 7,649,831 B2 | 1/2010 | Van Rensburg et al. |
| 7,664,200 B2 | 2/2010 | Ariyavisitakul et al. |
| 7,746,943 B2 | 6/2010 | Yamaura |
| 7,760,681 B1 | 7/2010 | Chhabra |
| 7,773,535 B2 | 8/2010 | Vook et al. |
| 7,773,685 B2 | 8/2010 | Tirkkonen et al. |
| 7,813,696 B2 | 10/2010 | Kim |
| 7,822,140 B2 | 10/2010 | Catreux et al. |
| 7,835,711 B2 | 11/2010 | McFarland |
| 7,839,201 B2 | 11/2010 | Jacobson |
| 7,885,211 B2 | 2/2011 | Shen et al. |
| 7,936,237 B2 | 5/2011 | Park et al. |
| 7,940,740 B2 | 5/2011 | Krishnamurthy et al. |
| 7,942,936 B2 | 5/2011 | Golden |
| 7,945,229 B2 | 5/2011 | Wilson et al. |
| 7,983,722 B2 | 7/2011 | Lowles et al. |
| 8,014,455 B2 | 9/2011 | Kim et al. |
| 8,072,285 B2 | 12/2011 | Spears et al. |
| 8,094,011 B2 | 1/2012 | Faris et al. |
| 8,095,081 B2 | 1/2012 | Vance |
| 8,098,120 B2 | 1/2012 | Steeneken et al. |
| 8,155,683 B2 | 4/2012 | Buckley et al. |
| 8,204,446 B2 | 6/2012 | Scheer et al. |
| 8,219,336 B2 | 7/2012 | Hoebel et al. |
| 8,219,337 B2 | 7/2012 | Hoebel et al. |
| 8,232,685 B2 | 7/2012 | Perper et al. |
| 8,233,851 B2 | 7/2012 | Jeon et al. |
| 8,244,317 B2 | 8/2012 | Knoppert et al. |
| 8,259,431 B2 | 9/2012 | Katta |
| 8,275,327 B2 | 9/2012 | Yi et al. |
| 8,280,038 B2 | 10/2012 | Johnson et al. |
| 8,280,323 B2 | 10/2012 | Thompson |
| 8,284,849 B2 | 10/2012 | Lee et al. |
| 8,302,183 B2 | 10/2012 | Sood |
| 8,319,393 B2 | 11/2012 | DeReus |
| 8,373,596 B1 | 2/2013 | Kimball et al. |
| 8,374,633 B2 | 2/2013 | Frank et al. |
| 8,384,695 B2 | 2/2013 | Lee et al. |
| 8,428,022 B2 | 4/2013 | Frank et al. |
| 8,460,961 B2 | 6/2013 | Guo et al. |
| 8,483,707 B2 | 7/2013 | Krishnamurthy et al. |
| 8,509,338 B2 | 8/2013 | Sayana et al. |
| 8,542,776 B2 | 9/2013 | Kim et al. |
| 8,588,426 B2 | 11/2013 | Xin et al. |
| 8,594,584 B2 | 11/2013 | Greene et al. |
| 8,606,200 B2 | 12/2013 | Ripley et al. |
| 8,611,829 B2 | 12/2013 | Alberth et al. |
| 8,620,348 B2 | 12/2013 | Shrivastava et al. |
| 8,626,083 B2 | 1/2014 | Greene et al. |
| 8,712,340 B2 | 4/2014 | Hoirup et al. |
| 8,712,355 B2 | 4/2014 | Black et al. |
| 8,731,496 B2 | 5/2014 | Drogi et al. |
| 8,761,296 B2 | 6/2014 | Zhang et al. |
| 8,767,722 B2 | 7/2014 | Kamble et al. |
| 8,909,173 B2 | 12/2014 | Harmke |
| 8,989,747 B2 | 3/2015 | Padden et al. |
| 9,002,354 B2 | 4/2015 | Krishnamurthy et al. |
| 9,031,523 B2 | 5/2015 | Anderson |
| 9,197,255 B2 | 11/2015 | Pourkhaatoun et al. |
| 9,203,489 B2 | 12/2015 | Sayana et al. |
| 9,215,659 B2 | 12/2015 | Asrani et al. |
| 9,241,050 B1 | 1/2016 | Asrani et al. |
| 9,298,303 B2 | 3/2016 | Wagner et al. |
| 9,301,177 B2 | 3/2016 | Ballantyne et al. |
| 9,326,320 B2 | 4/2016 | Hong et al. |
| 9,344,837 B2 | 5/2016 | Russel et al. |
| 2001/0034238 A1 | 10/2001 | Voyer |
| 2002/0037742 A1 | 3/2002 | Enderlein et al. |
| 2002/0057751 A1 | 5/2002 | Jagger et al. |
| 2002/0090974 A1 | 7/2002 | Hagn |
| 2002/0138254 A1 | 9/2002 | Isaka et al. |
| 2002/0149351 A1 | 10/2002 | Kanekawa et al. |
| 2002/0193130 A1 | 12/2002 | Yang et al. |
| 2003/0143961 A1 | 7/2003 | Humphreys et al. |
| 2003/0161485 A1 | 8/2003 | Smith |
| 2003/0222819 A1 | 12/2003 | Karr et al. |
| 2004/0051583 A1 | 3/2004 | Hellberg |
| 2004/0052314 A1 | 3/2004 | Copeland |
| 2004/0052317 A1 | 3/2004 | Love et al. |
| 2004/0057530 A1 | 3/2004 | Tarokh et al. |
| 2004/0063439 A1 | 4/2004 | Glazko et al. |
| 2004/0082356 A1 | 4/2004 | Walton et al. |
| 2004/0106428 A1 | 6/2004 | Shoji |
| 2004/0148333 A1 | 7/2004 | Manion et al. |
| 2004/0176125 A1 | 9/2004 | Lee |
| 2004/0178912 A1 | 9/2004 | Smith et al. |
| 2004/0192398 A1 | 9/2004 | Zhu |
| 2004/0198392 A1 | 10/2004 | Harvey et al. |
| 2004/0235433 A1 | 11/2004 | Hugl et al. |
| 2004/0246048 A1 | 12/2004 | Leyonhjelm et al. |
| 2005/0037733 A1 | 2/2005 | Coleman et al. |
| 2005/0041018 A1 | 2/2005 | Philipp |
| 2005/0075123 A1 | 4/2005 | Jin et al. |
| 2005/0124393 A1 | 6/2005 | Nuovo et al. |
| 2005/0134456 A1 | 6/2005 | Niu et al. |
| 2005/0135324 A1 | 6/2005 | Kim et al. |
| 2005/0136845 A1 | 6/2005 | Masuoka et al. |
| 2005/0208952 A1 | 9/2005 | Dietrich et al. |
| 2005/0227640 A1 | 10/2005 | Haque et al. |
| 2005/0250532 A1 | 11/2005 | Hwang et al. |
| 2006/0019677 A1 | 1/2006 | Teague et al. |
| 2006/0052131 A1 | 3/2006 | Ichihara |
| 2006/0067277 A1 | 3/2006 | Thomas et al. |
| 2006/0077952 A1 | 4/2006 | Kubsch et al. |
| 2006/0099940 A1 | 5/2006 | Pfleging et al. |
| 2006/0103635 A1 | 5/2006 | Park |
| 2006/0181453 A1 | 8/2006 | King et al. |
| 2006/0194593 A1 | 8/2006 | Drabeck et al. |
| 2006/0207806 A1 | 9/2006 | Philipp |
| 2006/0209754 A1 | 9/2006 | Ji et al. |
| 2006/0215618 A1 | 9/2006 | Soliman et al. |

(56) References Cited

U.S. PATENT DOCUMENTS

| | | |
|---|---|---|
| 2006/0240827 A1 | 10/2006 | Dunn |
| 2006/0245601 A1 | 11/2006 | Michaud et al. |
| 2006/0256887 A1 | 11/2006 | Kwon et al. |
| 2006/0280261 A1 | 12/2006 | Prikhodko et al. |
| 2006/0291393 A1 | 12/2006 | Teague et al. |
| 2006/0292990 A1 | 12/2006 | Karabinis et al. |
| 2007/0004344 A1 | 1/2007 | DeGroot et al. |
| 2007/0008108 A1 | 1/2007 | Schurig et al. |
| 2007/0026838 A1 | 2/2007 | Staudinger et al. |
| 2007/0042714 A1 | 2/2007 | Ayed |
| 2007/0049280 A1 | 3/2007 | Sambhwani et al. |
| 2007/0069735 A1 | 3/2007 | Graf et al. |
| 2007/0091004 A1 | 4/2007 | Puuri |
| 2007/0093281 A1 | 4/2007 | Park et al. |
| 2007/0133462 A1 | 6/2007 | Guey |
| 2007/0153743 A1 | 7/2007 | Mukkavilli et al. |
| 2007/0197180 A1 | 8/2007 | McKinzie et al. |
| 2007/0200766 A1 | 8/2007 | McKinzie et al. |
| 2007/0211657 A1 | 9/2007 | McBeath et al. |
| 2007/0211813 A1 | 9/2007 | Talwar et al. |
| 2007/0222629 A1 | 9/2007 | Yoneyama |
| 2007/0223422 A1 | 9/2007 | Kim et al. |
| 2007/0232370 A1 | 10/2007 | Kim |
| 2007/0238425 A1 | 10/2007 | McFarland |
| 2007/0238496 A1 | 10/2007 | Chung et al. |
| 2007/0243894 A1 | 10/2007 | Das et al. |
| 2007/0255558 A1 | 11/2007 | Yasunaga et al. |
| 2007/0280160 A1 | 12/2007 | Kim et al. |
| 2007/0285326 A1 | 12/2007 | McKinzie |
| 2008/0001915 A1 | 1/2008 | Pihlaja et al. |
| 2008/0002735 A1 | 1/2008 | Poirier et al. |
| 2008/0014960 A1 | 1/2008 | Chou |
| 2008/0026710 A1 | 1/2008 | Buckley |
| 2008/0080449 A1 | 4/2008 | Huang et al. |
| 2008/0089312 A1 | 4/2008 | Malladi |
| 2008/0095109 A1 | 4/2008 | Malladi et al. |
| 2008/0108310 A1* | 5/2008 | Tong .................... H04B 7/0617 455/69 |
| 2008/0111714 A1 | 5/2008 | Kremin |
| 2008/0117886 A1 | 5/2008 | Kim |
| 2008/0130626 A1 | 6/2008 | Ventola et al. |
| 2008/0132247 A1 | 6/2008 | Anderson |
| 2008/0133462 A1 | 6/2008 | Aylward et al. |
| 2008/0157893 A1 | 7/2008 | Krah |
| 2008/0159239 A1 | 7/2008 | Odlyzko et al. |
| 2008/0165876 A1 | 7/2008 | Suh et al. |
| 2008/0167040 A1 | 7/2008 | Khandekar et al. |
| 2008/0167073 A1 | 7/2008 | Hobson et al. |
| 2008/0170602 A1 | 7/2008 | Guey |
| 2008/0170608 A1 | 7/2008 | Guey |
| 2008/0186105 A1 | 8/2008 | Scuderi et al. |
| 2008/0192683 A1 | 8/2008 | Han et al. |
| 2008/0212520 A1 | 9/2008 | Chen et al. |
| 2008/0225693 A1 | 9/2008 | Zhang et al. |
| 2008/0227414 A1 | 9/2008 | Karmi et al. |
| 2008/0227481 A1 | 9/2008 | Naguib et al. |
| 2008/0232395 A1 | 9/2008 | Buckley et al. |
| 2008/0267310 A1 | 10/2008 | Khan et al. |
| 2008/0274753 A1 | 11/2008 | Attar et al. |
| 2008/0298482 A1 | 12/2008 | Rensburg et al. |
| 2008/0307427 A1 | 12/2008 | Pi et al. |
| 2008/0309633 A1 | 12/2008 | Hotelling et al. |
| 2008/0313146 A1 | 12/2008 | Wong et al. |
| 2008/0317259 A1 | 12/2008 | Zhang et al. |
| 2009/0041151 A1 | 2/2009 | Khan et al. |
| 2009/0055170 A1 | 2/2009 | Nagahama |
| 2009/0061790 A1 | 3/2009 | Rofougaran |
| 2009/0061887 A1 | 3/2009 | Hart et al. |
| 2009/0067382 A1 | 3/2009 | Li et al. |
| 2009/0091551 A1 | 4/2009 | Hotelling et al. |
| 2009/0102294 A1 | 4/2009 | Hodges et al. |
| 2009/0121963 A1 | 5/2009 | Greene |
| 2009/0122758 A1 | 5/2009 | Smith et al. |
| 2009/0122884 A1 | 5/2009 | Vook et al. |
| 2009/0228598 A1 | 9/2009 | Stamoulis et al. |
| 2009/0238131 A1 | 9/2009 | Montojo et al. |
| 2009/0243631 A1 | 10/2009 | Kuang |
| 2009/0252077 A1 | 10/2009 | Khandekar et al. |
| 2009/0256644 A1 | 10/2009 | Knudsen |
| 2009/0258614 A1 | 10/2009 | Walker |
| 2009/0262699 A1 | 10/2009 | Wdngerter et al. |
| 2009/0264078 A1 | 10/2009 | Yun et al. |
| 2009/0268675 A1 | 10/2009 | Choi |
| 2009/0270103 A1 | 10/2009 | Pani et al. |
| 2009/0285321 A1 | 11/2009 | Schulz et al. |
| 2009/0290544 A1 | 11/2009 | Yano et al. |
| 2009/0295226 A1 | 12/2009 | Hodges et al. |
| 2009/0298433 A1 | 12/2009 | Sorrells et al. |
| 2009/0307511 A1 | 12/2009 | Fiennes et al. |
| 2009/0323608 A1 | 12/2009 | Adachi et al. |
| 2010/0002657 A1 | 1/2010 | Teo et al. |
| 2010/0023898 A1 | 1/2010 | Nomura et al. |
| 2010/0034312 A1 | 2/2010 | Muharemovic et al. |
| 2010/0035627 A1 | 2/2010 | Hou et al. |
| 2010/0046460 A1 | 2/2010 | Kwak et al. |
| 2010/0046650 A1 | 2/2010 | Jongren et al. |
| 2010/0056166 A1 | 3/2010 | Tenny |
| 2010/0085010 A1 | 4/2010 | Suzuki et al. |
| 2010/0103949 A1 | 4/2010 | Jung et al. |
| 2010/0106459 A1 | 4/2010 | Bakalov |
| 2010/0109796 A1 | 5/2010 | Park et al. |
| 2010/0118706 A1 | 5/2010 | Parkvall et al. |
| 2010/0118839 A1 | 5/2010 | Malladi et al. |
| 2010/0156728 A1 | 6/2010 | Alvey et al. |
| 2010/0157858 A1 | 6/2010 | Lee et al. |
| 2010/0157924 A1 | 6/2010 | Prasad et al. |
| 2010/0159833 A1 | 6/2010 | Lewis et al. |
| 2010/0161658 A1 | 6/2010 | Hamynen et al. |
| 2010/0165882 A1 | 7/2010 | Palanki et al. |
| 2010/0167743 A1 | 7/2010 | Palanki et al. |
| 2010/0172310 A1 | 7/2010 | Cheng et al. |
| 2010/0172311 A1 | 7/2010 | Agrawal et al. |
| 2010/0182903 A1 | 7/2010 | Palanki et al. |
| 2010/0189191 A1 | 7/2010 | Taoka et al. |
| 2010/0195566 A1 | 8/2010 | Krishnamurthy et al. |
| 2010/0208838 A1 | 8/2010 | Lee et al. |
| 2010/0217590 A1 | 8/2010 | Nemer et al. |
| 2010/0220801 A1 | 9/2010 | Lee et al. |
| 2010/0260154 A1 | 10/2010 | Frank et al. |
| 2010/0271330 A1 | 10/2010 | Philipp |
| 2010/0272094 A1 | 10/2010 | Byard et al. |
| 2010/0311437 A1 | 12/2010 | Palanki et al. |
| 2010/0317343 A1 | 12/2010 | Krishnamurthy |
| 2010/0322176 A1 | 12/2010 | Chen et al. |
| 2010/0323718 A1 | 12/2010 | Jen |
| 2011/0039583 A1 | 2/2011 | Frank et al. |
| 2011/0051834 A1 | 3/2011 | Lee et al. |
| 2011/0080969 A1 | 4/2011 | Jongren et al. |
| 2011/0083066 A1 | 4/2011 | Chung et al. |
| 2011/0085588 A1 | 4/2011 | Zhuang et al. |
| 2011/0085610 A1 | 4/2011 | Zhuang et al. |
| 2011/0096739 A1 | 4/2011 | Heidari et al. |
| 2011/0103498 A1 | 5/2011 | Chen et al. |
| 2011/0105023 A1 | 5/2011 | Scheer |
| 2011/0116423 A1 | 5/2011 | Rousu et al. |
| 2011/0116436 A1 | 5/2011 | Bachu et al. |
| 2011/0117925 A1 | 5/2011 | Sampath et al. |
| 2011/0119005 A1 | 5/2011 | Majima et al. |
| 2011/0121836 A1 | 5/2011 | Kim et al. |
| 2011/0143770 A1 | 6/2011 | Charbit et al. |
| 2011/0143773 A1 | 6/2011 | Kangas et al. |
| 2011/0148625 A1 | 6/2011 | Velusamy |
| 2011/0148700 A1 | 6/2011 | Lasagabaster et al. |
| 2011/0149868 A1 | 6/2011 | Krishnamurthy et al. |
| 2011/0149903 A1 | 6/2011 | Krishnamurthy et al. |
| 2011/0157067 A1 | 6/2011 | Wagner et al. |
| 2011/0158200 A1 | 6/2011 | Bachu et al. |
| 2011/0176252 A1 | 7/2011 | DeReus |
| 2011/0189964 A1 | 8/2011 | Jeon et al. |
| 2011/0190016 A1 | 8/2011 | Hamabe et al. |
| 2011/0216840 A1 | 9/2011 | Lee et al. |
| 2011/0244884 A1 | 10/2011 | Kangas et al. |
| 2011/0249637 A1* | 10/2011 | Hammarwall ....... H04B 7/0634 370/329 |

(56) References Cited

U.S. PATENT DOCUMENTS

| | | |
|---|---|---|
| 2011/0250852 A1 | 10/2011 | Greene |
| 2011/0263303 A1 | 10/2011 | Lowles et al. |
| 2011/0268101 A1 | 11/2011 | Wang |
| 2011/0274188 A1 | 11/2011 | Sayana et al. |
| 2011/0281532 A1 | 11/2011 | Shin et al. |
| 2011/0285603 A1 | 11/2011 | Skarp |
| 2011/0286349 A1 | 11/2011 | Tee et al. |
| 2011/0292844 A1 | 12/2011 | Kwun et al. |
| 2011/0319027 A1 | 12/2011 | Sayana |
| 2012/0002609 A1 | 1/2012 | Larsson et al. |
| 2012/0008510 A1 | 1/2012 | Cai et al. |
| 2012/0021769 A1 | 1/2012 | Lindoff et al. |
| 2012/0032646 A1 | 2/2012 | Lee |
| 2012/0039251 A1 | 2/2012 | Sayana |
| 2012/0050122 A1 | 3/2012 | Wu et al. |
| 2012/0052903 A1 | 3/2012 | Han et al. |
| 2012/0071195 A1 | 3/2012 | Chakraborty et al. |
| 2012/0076043 A1 | 3/2012 | Nishio et al. |
| 2012/0077538 A1 | 3/2012 | Yun |
| 2012/0106475 A1 | 5/2012 | Jung |
| 2012/0112851 A1 | 5/2012 | Manssen et al. |
| 2012/0120772 A1 | 5/2012 | Fujisawa |
| 2012/0120934 A1 | 5/2012 | Cho |
| 2012/0122478 A1 | 5/2012 | Siomina et al. |
| 2012/0158839 A1 | 6/2012 | Hassan et al. |
| 2012/0161927 A1 | 6/2012 | Pierfelice et al. |
| 2012/0162129 A1 | 6/2012 | Krah et al. |
| 2012/0170541 A1 | 7/2012 | Love et al. |
| 2012/0177089 A1 | 7/2012 | Pelletier et al. |
| 2012/0178370 A1 | 7/2012 | George |
| 2012/0182144 A1 | 7/2012 | Richardson et al. |
| 2012/0206556 A1 | 8/2012 | Yu et al. |
| 2012/0214412 A1 | 8/2012 | Schlub et al. |
| 2012/0214421 A1 | 8/2012 | Hoirup et al. |
| 2012/0214549 A1 | 8/2012 | Philbin |
| 2012/0220243 A1 | 8/2012 | Mendolia |
| 2012/0295554 A1 | 11/2012 | Greene et al. |
| 2012/0295555 A1 | 11/2012 | Greene et al. |
| 2012/0302188 A1 | 11/2012 | Sahota et al. |
| 2012/0306716 A1 | 12/2012 | Satake et al. |
| 2012/0309388 A1 | 12/2012 | Moosavi et al. |
| 2012/0309413 A1 | 12/2012 | Grosman et al. |
| 2012/0316967 A1 | 12/2012 | Mgrdechian et al. |
| 2013/0030803 A1 | 1/2013 | Liao |
| 2013/0034241 A1 | 2/2013 | Pandey et al. |
| 2013/0039284 A1 | 2/2013 | Marinier et al. |
| 2013/0040578 A1 | 2/2013 | Khoshnevis et al. |
| 2013/0059600 A1 | 3/2013 | Elsom-Cook et al. |
| 2013/0078980 A1 | 3/2013 | Saito |
| 2013/0094484 A1 | 4/2013 | Kneckt et al. |
| 2013/0109314 A1 | 5/2013 | Kneckt et al. |
| 2013/0109334 A1 | 5/2013 | Kwon et al. |
| 2013/0142113 A1 | 6/2013 | Fong et al. |
| 2013/0150092 A1 | 6/2013 | Frank et al. |
| 2013/0178175 A1 | 7/2013 | Kato |
| 2013/0194154 A1 | 8/2013 | Baliarda et al. |
| 2013/0195283 A1 | 8/2013 | Larson et al. |
| 2013/0195296 A1 | 8/2013 | Merks |
| 2013/0231151 A1 | 9/2013 | Kneckt et al. |
| 2013/0286937 A1 | 10/2013 | Liu et al. |
| 2013/0307735 A1 | 11/2013 | Contreras et al. |
| 2013/0310102 A1 | 11/2013 | Chao et al. |
| 2013/0316687 A1 | 11/2013 | Subbaramoo et al. |
| 2013/0322375 A1 | 12/2013 | Chang et al. |
| 2013/0322562 A1 | 12/2013 | Zhang et al. |
| 2013/0325149 A1 | 12/2013 | Manssen et al. |
| 2014/0024321 A1 | 1/2014 | Zhu et al. |
| 2014/0044126 A1 | 2/2014 | Sabhanatarajan et al. |
| 2014/0068288 A1 | 3/2014 | Robinson et al. |
| 2014/0092830 A1 | 4/2014 | Chen et al. |
| 2014/0093091 A1 | 4/2014 | Dusan et al. |
| 2014/0185498 A1 | 7/2014 | Schwent et al. |
| 2014/0227981 A1 | 8/2014 | Pecen et al. |
| 2014/0273882 A1 | 9/2014 | Asrani et al. |
| 2014/0273886 A1 | 9/2014 | Black et al. |
| 2014/0313088 A1 | 10/2014 | Rozenblit et al. |
| 2014/0349593 A1 | 11/2014 | Danak et al. |
| 2014/0376652 A1 | 12/2014 | Sayana et al. |
| 2014/0379332 A1 | 12/2014 | Rodriguez et al. |
| 2015/0017978 A1 | 1/2015 | Hong et al. |
| 2015/0024786 A1 | 1/2015 | Asrani et al. |
| 2015/0031420 A1 | 1/2015 | Higaki et al. |
| 2015/0072632 A1 | 3/2015 | Pourkhaatoun et al. |
| 2015/0080047 A1 | 3/2015 | Russell et al. |
| 2015/0092954 A1 | 4/2015 | Coker et al. |
| 2015/0171919 A1 | 6/2015 | Ballantyne et al. |
| 2015/0181388 A1 | 6/2015 | Smith |
| 2015/0236828 A1 | 8/2015 | Park et al. |
| 2015/0245323 A1 | 8/2015 | You et al. |
| 2015/0280876 A1 | 10/2015 | You et al. |
| 2015/0312058 A1 | 10/2015 | Black et al. |
| 2015/0349410 A1 | 12/2015 | Russell et al. |
| 2015/0365065 A1 | 12/2015 | Higaki et al. |
| 2016/0014727 A1 | 1/2016 | Nimbalker |
| 2016/0036482 A1 | 2/2016 | Black et al. |

FOREIGN PATENT DOCUMENTS

| | | |
|---|---|---|
| CN | 1984476 | 6/2007 |
| CN | 101035379 | 9/2007 |
| DE | 10053205 | 5/2002 |
| DE | 10118189 | 11/2002 |
| EP | 0695059 | 1/1996 |
| EP | 1158686 | 11/2001 |
| EP | 1298809 | 4/2003 |
| EP | 1357543 | 10/2003 |
| EP | 1511010 | 3/2005 |
| EP | 1753152 | 2/2007 |
| EP | 1443791 | 2/2009 |
| EP | 2487967 | 8/2012 |
| EP | 2255443 | 11/2012 |
| EP | 2557433 | 2/2013 |
| EP | 2568531 | 3/2013 |
| EP | 2590258 | 5/2013 |
| JP | H09247852 | 9/1997 |
| JP | 2000286924 | 10/2000 |
| KR | 20050058333 | 6/2005 |
| RU | 2005113251 | 1/2006 |
| WO | WO-9306682 | 4/1993 |
| WO | WO-9416517 | 7/1994 |
| WO | WO-9600401 | 1/1996 |
| WO | WO-9921389 | 4/1999 |
| WO | WO-9950968 | 10/1999 |
| WO | WO-0111721 | 2/2001 |
| WO | WO-03007508 | 1/2003 |
| WO | WO-03107327 | 12/2003 |
| WO | WO-2004021634 | 3/2004 |
| WO | WO-20040040800 | 5/2004 |
| WO | WO-2004084427 | 9/2004 |
| WO | WO-2004084447 | 9/2004 |
| WO | WO-2006039434 | 4/2006 |
| WO | WO-2006046192 | 5/2006 |
| WO | WO-2006130278 | 12/2006 |
| WO | WO 2007052115 | 5/2007 |
| WO | WO-2007080727 | 7/2007 |
| WO | WO-2008027705 | 3/2008 |
| WO | WO-2008033117 | 3/2008 |
| WO | WO-2008085107 | 7/2008 |
| WO | WO-2008085416 | 7/2008 |
| WO | WO-2008085720 | 7/2008 |
| WO | WO-2008112849 | 9/2008 |
| WO | WO-2008113210 | 9/2008 |
| WO | WO-2008137354 | 11/2008 |
| WO | WO-2008137607 | 11/2008 |
| WO | WO-2008156081 | 12/2008 |
| WO | WO-2009107090 | 9/2009 |
| WO | WO-2010080845 | 7/2010 |
| WO | WO-2010124244 | 10/2010 |
| WO | WO-2010138039 | 12/2010 |
| WO | WO-2012115649 | 8/2012 |
| WO | WO-2012149968 | 11/2012 |

(56) References Cited

FOREIGN PATENT DOCUMENTS

WO   WO-2012177939   12/2012
WO   WO-2013131268   9/2013

OTHER PUBLICATIONS

"A feedback framework based on W2W1 for Rei. 10", 3GPP TSG RAN WG1 #61bis, R1-103664,, Jun. 2010, 19 pages.
"Addition of PRS Muting Configuration Information to LPPa", 3GPP TSG RAN3 #68, Montreal, Canada; Ericsson, R3-101526, May 2010, 7 pages.
"Best Companion' reporting for improved single-cell MU-MIMO pairing", 3GPP TSG RAN WG1 #56; Athens, Greece; Alcatei-Lucent, R1-090926, Feb. 2009, 5 pages.
"Change Request—Clarification of the CP length of empty OFDM symbols in PRS subframes", 3GPP TSG RAN WG1 #59bis, Jeju, Vaiencia, Spain, ST-Ericsson, Motorola, Qualcomm Inc, R1-100311;, Jan. 2009, 2 pages.
"Change Request 36.211—Introduction of L TE Positioning", 3GPP TSG RAN WG1 #59, Jeju, South Korea; Ericsson, R1-095027, May 2010, 6 pages.
"Change Request 36.213 Clarification of POSCH and PRS in combination for L TE positioning", 3GPP TSG RAN WG1 #58bis, Miyazaki, Japan; Ericsson, et al., R1-094262;, Oct. 2009, 4 pages.
"Change Request 36.214—Introduction of LTE Positioning", 3GPP TSG RAN WG1 #59, Jeju, South Korea, Ericsson, et al., R1-094430, Nov. 2009, 4 pages.
"Companion Subset Based PMI/CQI Feedback for LTE-A MU-MIMO", 3GPP TSG RAN WG1 #60; San Francisco, USA, RIM; R1-101104, Feb. 2010, 8 pages.
"Comparison of PMI-based and SCF-based MU-MIMO", 3GPP TSG RAN1 #58; Shenzhen, China; R1-093421 Aug. 2009, 5 pages.
"Development of two-stage feedback framework for Rel-10", 3GPP TSG RAN WG1 #60bis Meeting, R1-101859, Alcatel-Lucent Shanghai Bell, Alcatel-Lucent, Apr. 2010, 5 pages.
"Digital cellular telecommunications system (Phase 2+)", Location Services (LCS); Broadcast Network Assistance for Enhanced Observed Time Difference (E-OTD) and Global Positioning System (GPS) Positioning Methods (3GPP TS 04.35 version 8.3.0 Release 1999), 2001, 37 pages.
"Discussions on UE positioning issues", 3GPP TSG-RAN WG1 #57 R1-091911, San Francisco, USA,, May 2009, 12 pages.
"DL Codebook design for 8Tx preceding", 3GPP TSG RAN WG1 #60bis, R1-102380, LG Electronics, Beijing, China, Apr. 2010, 4 pages.
"Double codebook design principles", 3GPP TSG RAN WG1 #61bis, R1-103804, Nokia, Nokia Siemens Networks, Dresden, Germany, Jun. 2010, 9 pages.
"Evaluation of protocol architecture alternatives for positioning", 3GPP TSG-RAN WG2 #66bis R2-093855, Los Angeles, CA, USA, Jun. 2009, 4 pages.
"Ex Parte Quayle Action", U.S. Appl. No. 13/088,237, filed Dec. 19, 2012, 5 pages.
"Extended European Search Report", EP Application No. 12196319.3, Feb. 27, 2014, 7 pages.
"Extended European Search Report", EP Application No. 12196328.4, Feb. 26, 2014, 7 pages.
"Extensions to Rel-8 type CQI/PMI/RI feedback using double codebook structure", 3GPP TSG RAN WG1#59bis, R1-100251, Valencia, Spain,, Jan. 2010, 4 pages.
"Feedback Codebook Design and Performance Evaluation", 3GPP TSG RAN WG1 #61bis, R1-103970, LG Electronics, Jun. 2010, 6 pages.
"Feedback considerations for DL MIMO and CoMP", 3GPP TSG RAN WG1 #57bis; Los Angeles, USA; Qualcomm Europe; R1-092695, Jun. 2009, 6 pages.
"Final Office Action", U.S. Appl. No. 12/573,456, Mar. 21, 2012, 12 pages.
"Final Office Action", U.S. Appl. No. 12/756,777, Nov. 1, 2013, 12 pages.
"Final Office Action", U.S. Appl. No. 12/899,211, Oct. 24, 2013, 17 pages.
"Final Rejection", U.S. Appl. No. 12/407,783, Feb. 15, 2012, 18 pages.
"Foreign Office Action", CN Application No. 201080025882.7, Feb. 8, 2014, 19 pages.
"Further details on DL OTDOA", 3GPP TSG RAN WG1 #56bis, Seoul, South Korea—Ericsson, R1-091312,, Mar. 2009, 6 pages.
"Further Refinements of Feedback Framework", 3GPP TSG-RAN WG1 #60bis R1-101742; Ericsson, ST-Ericsson, Apr. 2010, 8 pages.
"IEEE 802.16m System Description Document [Draft]", IEEE 802.16 Broadband Wireless Access Working Group, Nokia, Feb. 7, 2009, 171 pages.
"Implicit feedback in support of downlink MU-MIMO Texas Instruments", 3GPP TSG RAN WG1 #58; Shenzhen, China, R1-093176, Aug. 2009, 4 pages.
"Improving the hearability of LTE Positioning Service", 3GPP TSG RAN WG1 #55bis; Alcatei-Lucent, R1-090053 Jan. 2009, 5 pages.
"International Search Report and Written Opinion", Application No. PCT/US2010/026579, Feb. 4, 2011, 13 pages.
"International Search Report and Written Opinion", Application No. PCT/US2011/034959, Aug. 16, 2011, 13 pages.
"International Search Report and Written Opinion", Application No. PCT/US2011/045209, Oct. 28, 2011, 14 pages.
"International Search Report and Written Opinion", Application No. PCT/US2011/039214, Sep. 14, 2011, 9 pages.
"International Search Report and Written Opinion", Application No. PCT/US2010/038257, Oct. 1, 2010, 9 pages.
"International Search Report and Written Opinion", Application No. PCT/US2010/034023, Dec. 1, 2010, 9 pages.
"International Search Report", Application No. PCT/US2010/030516, Oct. 8, 2010, 5 pages.
"International Search Report", Application No. PCT/US2010/036982, Nov. 22, 2010, 4 pages.
"International Search Report", Application No. PCT/US2010/041451, Oct. 25, 2010, 3 pages.
"International Search Report", Application No. PCT/US2011/044103, Oct. 24, 2011, 3 pages.
"Introduction of L TE Positioning", 3GPP TSG RAN WG1 #58, Shenzhen, China, R1-093604; Draft CR 36.213, Aug. 2009, 3 pages.
"Introduction of L TE Positioning", 3GPP TSG RAN WG1 #59, Jeju, South Korea, Ericsson et al.; R1-094429,, Nov. 2009, 5 pages.
"Introduction of LTE Positioning", 3GPP TSG RAN WG1 #58, Shenzhen, China; Draft CR 36.214; R1-093605;, Aug. 2009, 6 pages.
"Introduction of LTE Positioning", 3GPP TSG-RAN WG1 Meeting #58, R1-093603, Shenzhen, China,, Aug. 2009, 5 pages.
"LS on 12 5. Assistance Information for OTDOA Positioning Support for L TE Rel-9", 3GPP TSG RAN WG1 Meeting #58; Shenzhen, China; R1-093729, Aug. 2009, 3 pages.
"LS on LTE measurement supporting Mobility", 3GPP TSG WG1 #48, Tdoc R1-071250; StLouis, USA, Feb. 2007, 2 pages.
"LTE Positioning Protocol (LPP)", 3GPP TS 36.355 V9.0.0 (Dec. 2009); 3rd Generation Partnership Project; Technical Specification Group Radio Access Network; Evolved Universal Terrestrial Radio Access (E-UTRA); Release 9, Dec. 2009, 102 pages.
"Method for Channel Quality Feedback in Wireless Communication Systems", U.S. Appl. No. 12/823,178, filed Jun. 25, 2010, 34 pages.
"Non-Final Office Action", U.S. Appl. No. 12/407,783, Sep. 9, 2013, 16 pages.
"Non-Final Office Action", U.S. Appl. No. 12/407,783, Oct. 5, 2011, 14 pages.
"Non-Final Office Action", U.S. Appl. No. 12/480,289, Jun. 9, 2011, 20 pages.
"Non-Final Office Action", U.S. Appl. No. 12/492,339, Aug. 19, 2011, 13 pages.
"Non-Final Office Action", U.S. Appl. No. 12/542,374, Feb. 24, 2014, 25 pages.
"Non-Final Office Action", U.S. Appl. No. 12/542,374, Aug. 7, 2013, 22 pages.
"Non-Final Office Action", U.S. Appl. No. 12/542,374, Aug. 31, 2012, 27 pages.
"Non-Final Office Action", U.S. Appl. No. 12/542,374, Dec. 23, 2011, 22 pages.

(56) References Cited

OTHER PUBLICATIONS

"Non-Final Office Action", U.S. Appl. No. 12/573,456, Nov. 18, 2011, 9 pages.
"Non-Final Office Action", U.S. Appl. No. 12/577,553, Feb. 4, 2014, 10 pages.
"Non-Final Office Action", U.S. Appl. No. 12/577,553, Aug. 12, 2013, 11 pages.
"Non-Final Office Action", U.S. Appl. No. 12/577,553, Dec. 28, 2011, 7 pages.
"Non-Final Office Action", U.S. Appl. No. 12/756,777, Apr. 19, 2013, 17 pages.
"Non-Final Office Action", U.S. Appl. No. 12/813,221, Oct. 8, 2013, 10 pages.
"Non-Final Office Action", U.S. Appl. No. 12/823,178, Aug. 23, 2012, 15 pages.
"Non-Final Office Action", U.S. Appl. No. 12/899,211, Apr. 10, 2014, 12 pages.
"Non-Final Office Action", U.S. Appl. No. 12/899,211, May 22, 2013, 17 pages.
"Non-Final Office Action", U.S. Appl. No. 12/973,467, Mar. 28, 2013, 9 pages.
"Non-Final Office Action", U.S. Appl. No. 13/759,089, Apr. 18, 2013, 16 pages.
"Non-Final Office Action", U.S. Appl. No. 13/924,838, Nov. 28, 2014, 6 pages.
"Notice of Allowance", U.S. Appl. No. 12/365,166, Apr. 16, 2010, 7 pages.
"Notice of Allowance", U.S. Appl. No. 12/365,166, Aug. 25, 2010, 4 pages.
"Notice of Allowance", U.S. Appl. No. 13/040,090, Mar. 8, 2012, 6 pages.
"Notice of Allowance", U.S. Appl. No. 13/088,237, Jun. 17, 2013, 8 pages.
"Notice of Allowance", U.S. Appl. No. 13/088,237, Jul. 11, 2013, 8 pages.
"Notice of Allowance", U.S. Appl. No. 13/188,419, May 22, 2013, 8 pages.
"Notice of Allowance", U.S. Appl. No. 13/924,838, Mar. 12, 2015, 7 pages.
"Notice of Allowance", U.S. Appl. No. 13/924,838, Jul. 8, 2015, 7 pages.
"On Extensions to Rel-8 PMI Feedback", 3GPP TSG RAN WG1 #60, R1-101129, Motorola, San Francisco, USA,, Feb. 2010, 4 pages.
"On OTDOA in LTE", 3GPP TSG RAN WG1 #55bis, Ljubljana, Slovenia; R1-090353, Jan. 2009, 8 pages.
"On OTDOA method for L TE Positioning", 3GPP TSG RAN WG1 #56, Ericsson, R1-090918, Athens, Greece, Feb. 2009, 6 pages.
"On Serving Cell Muting for OTDOA Measurements", 3GPP TSG RAN1 #57, R1-092628—Los Angeles, CA, USA, Jun. 2009, 7 pages.
"Performance evaluation of adaptive codebook as enhancement of 4 Tx feedback", 3GPP TSG RAN WG1#61bis, R1-103447, Jul. 2010, 6 pages.
"PHY Layer 1 1 4. Specification Impact of Positioning Improvements", 3GPP TSG RAN WG1 #56bis, Athens, Greece; Qualcomm Europe, R1-090852,, Feb. 2009, 3 pages.
"Physical Channels and Modulation (Release 8)", 3GPP TS 36.211 V8.6.0 (Mar. 2009) 3rd Generation Partnership Project; Technical Specification Group Radio Access 28 Network; Evolved Universal Terrestrial Radio Access (E-UTRA);, Mar. 2009, 83 pages.
"Physical Channels and Modulation (Release 9)", 3GPP TS 36.211 V9.0.0 (Dec. 2009); 3rd Generation Partnership Project; Technical Specification Group Radio Access Network; Evolved Universal Terrestrial Radio Access (E-UTRA); Release 9, Dec. 2009, 85 pages.
"Physical layer procedures", 3GPP TS 36.213 V9.0.1 (Dec. 2009); 3rd Generation Partnership Project; Technical Specification Group Radio Access Network; Evolved Universal Terrestrial Radio Access (E-UTRA); Release 9, Dec. 2009, 79 pages.
"Positioning Subframe Muting for OTDOA Measurements", 3GPP TSG RAN1 #58 R1-093406, Shenzhen, P. R. China, Aug. 2009, 9 pages.

"Positioning Support for L TE", 3GPP TSG RAN WG1 #42, Athens, Greece, RP-080995, Dec. 2008, 5 pages.
"Rationale for mandating simulation of 4Tx Widely-Spaced Cross-Polarized Antenna Configuration for LTE-Advanced MU-MIMO", 3GPP TSG-RAN WG1 Meeting #61bis, R1-104184, Dresden, Germany, Jun. 2010, 5 pages.
"Reference Signals for Low Interference Subframes in Downlink;", 3GPP TSG RAN WG1 Meeting #56bis; Seoul, South Korea; Ericsson; R1-091314, Mar. 2009, 8 pages.
"Signalling Support for PRS Muting in", 3GPP TSG RAN2 #70, Montreal, Canada; Ericsson, ST-Ericsson; R2-103102, May 2010, 2 pages.
"Some Results on DL-MIMO Enhancements for LTE-A", 3GPP TSG WG1 #55bis, R1-090328, Motorola; Ljubjana, Slovenia, Jan. 2009, 5 pages.
"Sounding RS Control Signaling for Closed Loop Antenna Selection", 3GPP TSG RAN #51, R1-080017—Mitsubishi Electric, Jan. 2008, 8 pages.
"Study on hearability of reference signals in LTE positioning support", 3GPP TSG RAN1 #56bisa—R1-091336, Seoul, South Korea, Mar. 2009, 8 pages.
"System Simulation Results for OTDOA", 3GPP TSG RAN WG4 #53, Jeju, South Korea, Ericsson, R4-094532;, Nov. 2009, 3 pages.
"Technical 1 34. Specification Group Radio Access Network; Evolved Universal Terrestrial Radio Access (E-UTRA);", 3GPP TS 36.211 v8.4.0 (Sep. 2008); 3rd Generation Partnership Project; Physical Channels and Modulation (Release 8), 2008, 78 pages.
"Technical Specification Group Radio Access Network", 3GPP TS 25.305 V8.1.0 (Dec. 2008) 3rd Generation Partnership Project; Stage 2 functional specification of User Equipment (UE) positioning in UTRAN (Release 8), 2008, 79 pages.
"Technical Specification Group Radio Access Network; Evolved Universal Terrestrial Radio Access (E-UTRA)", 3GPP TS 36.305 V0.2.0 (May 2009) 3rd generation Partnership Project; Stage 2 functional specification of User Equipment, (UE) positioning in E-UTRAN (Release 9);, 2010, 52 pages.
"Text 1 3 0. proposal on Orthonogonal PRS transmissions in mixed CP deployments using MBSFN subframes", 3GPP TSG RAN WG1 #59, Jeju, South Korea, Motorola, R1-095003;, Nov. 2009, 4 pages.
"Text proposal on measurements", 3GPP TSG RAN2 #60bis, Tdoc R2-080420; Motorola, Sevilla, Spain, Jan. 2008, 9 pages.
"Two Component Feedback Design and Codebooks", 3GPP TSG RAN1 #61, R1-103328, Motorola, Montreal, Canada, May 2010, 7 pages.
"Two-Level Codebook design for MU MIMO enhancement", 3GPP TSG RAN WG1 #60, R1-102904, Montreal, Canada, May 2010, 8 pages.
"UTRAN SFN-SFN observed lime 11 difference measurement & 3GPP TS 25.311 IE 10.3.7.106 "UE positioning OTDOA neighbour cell info' assistance data D fields"", 3GPP TSG RAN WG4 (Radio) #20, New Jersey, USA; Tdoc R4-011408,, Nov. 2001, 4 pages.
"View on the feedback framework for Rei. 1 0", 3GPP TSG RAN WG1 #61, R1-103026, Samsung, Montreal, Canada, May 2010, 15 pages.
"Views on Codebook Design for Downlink 8Tx MIMO", 3GPP TSG RAN WG1 #60. R1-101219, San Francisco, USA, Feb. 2010, 9 pages.
Colin,"Restrictions on Autonomous Muting to Enable 1 58. Time Difference of Arrival Measurements", U.S. Appl. No. 61/295,678, filed Jan. 15, 2010, 26 pages.
Costas,"A Study of a Class of Detection Waveforms Having Nearly Ideal Range-Doppler Ambiguity Properties", Fellow, IEEE; Proceedings of the IEEE, vol. 72, No. 8, Aug. 1984, 14 pages.
Guey,"Synchronization Signal Design for OFDM Based on Time-Frequency Hopping Patterns", Ericsson Research; North Carolina, USA;, 2007, 6 pages.
Jafar,"On Optimality of Beamforming for Multiple Antenna Systems with Imperfect Feedback", Department of Electrical Engineering, Stanford University, CA, USA, 2004, 7 pages.
Knoppert,"Communication Device", U.S. Appl. No. 29/329,028, filed Dec. 8, 2008, 10 pages.
Knoppert,"Indicator Shelf for Portable Electronic Device", U.S. Appl. No. 12/480,289, filed Jun. 8, 2009, 15 pages.

(56) References Cited

OTHER PUBLICATIONS

Krishnamurthy,"Interference Control, SINR Optimization and Signaling Enhancements to Improve the Performance of OTDOA Measurements", U.S. Appl. No. 12/813,221, filed Jun. 10, 2010, 20 pages.
Krishnamurthy,"Threshold Determination in TDOA-Based Positioning System", U.S. Appl. No. 12/712,191, filed Feb. 24, 2010, 19 pages.
Sayana,"Method of Codebook Design and Precoder Feedback in Wireless Communication Systems", U.S. Appl. No. 61/374,241, filed Aug. 16, 2010, 40 pages.
Sayana,"Method of Precoder Information Feedback in Multi-Antenna Wireless Communication Systems", U.S. Appl. No. 61/331,818, filed May 5, 2010, 43 pages.
Visotsky,"Space—Time Transmit PrecodingWith Imperfect Feedback", IEEE Transactions on Information Theory, vol. 47, No. 6, Sep. 2001, pp. 2632-2639.
Zhuang,"Method for Precoding Based on Antenna Grouping", U.S. Appl. No. 12/899,211, filed Oct. 6, 2010, 26 pages.
"Advisory Action", U.S. Appl. No. 12/650,699, Jan. 30, 2013, 3 pages.
"Advisory Action", U.S. Appl. No. 12/650,699, Sep. 25, 2014, 3 pages.
"An-1432 the LM4935 Headset and Push-Button Detection Guide", Texas Instruments Incorporated—http://www.ti.com/lit/an/snaa024a.snaa024a.pdf, May 2013, 8 pages.
"Earbud with Push-to-Talk Microphone", Motorola, Inc., model 53727, iDEN 2.5 mm 4-pole mono PTT headset NNTNN5006BP, 2013, 10 pages.
"Final Improvement Proposal for PTT Support in HFP", Bluetooth SIG, Inc., revision V10r00 (PTTinHFP_FIPD), Jul. 20, 2010, 50 pages.
"Final Office Action", U.S. Appl. No. 12/650,699, Jul. 16, 2014, 20 pages.
"Final Office Action", U.S. Appl. No. 12/650,699, Jul. 29, 2015, 26 pages.
"Final Office Action", U.S. Appl. No. 12/650,699, Nov. 13, 2012, 17 pages.
"Final Office Action", U.S. Appl. No. 13/477,609, Jul. 31, 2015, 11 pages.
"Final Office Action", U.S. Appl. No. 13/721,771, Oct. 29, 2015, 8 pages.
"Final Office Action", U.S. Appl. No. 13/733,297, Jul. 22, 2015, 20 pages.
"Final Office Action", U.S. Appl. No. 13/873,557, Jul. 17, 2015, 13 pages.
"Final Office Action", U.S. Appl. No. 14/012,050, Jul. 6, 2015, 23 pages.
"Final Office Action", U.S. Appl. No. 14/052,903, Oct. 1, 2015, 10 pages.
"Final Office Action", U.S. Appl. No. 14/280,775, Dec. 9, 2015, 13 pages.
"Innovator in Electronics, Technical Update, Filters & Modules PRM Alignment", Module Business Unit, Apr. 2011, 95 pages.
"International Preliminary Report on Patentability", Application No. PCT/US2013/042042, Mar. 10, 2015, 8 pages.
"International Search Report and Written Opinion", Application No. PCT/US2014/060440, Feb. 5, 2015, 11 pages.
"International Search Report and Written Opinion", Application No. PCT/US2015/031328, Aug. 12, 2015, 11 pages.
"International Search Report and Written Opinion", Application No. PCT/US2014/045755, Oct. 23, 2014, 11 pages.
"International Search Report and Written Opinion", Application No. PCT/US2014/045956, Oct. 31, 2014, 11 pages.
"International Search Report and Written Opinion", Application No. PCT/US2014/056642, Dec. 9, 2014, 11 pages.
"International Search Report and Written Opinion", Application No. PCT/US2013/071615, Mar. 5, 2014, 13 pages.
"International Search Report and Written Opinion", Application No. PCT/US2013/040242, Oct. 4, 2013, 14 pages.
"International Search Report and Written Opinion", Application No. PCT/US2014/047233, Jan. 22, 2015, 8 pages.
"International Search Report and Written Opinion", Application No. PCT/US2013/077919, Apr. 24, 2014, 8 pages.
"International Search Report and Written Opinion", Application No. PCT/US2014/070925, May 11, 2015, 9 pages.
"International Search Report and Written Opinion", Application No. PCT/US2014/018564, Jun. 18, 2014, 11 pages.
"International Search Report and Written Opinion", Application No. PCT/US2013/072718, Jun. 18, 2014, 12 pages.
"International Search Report and Written Opinion", Application No. PCT/US2015/027872, Jul. 15, 2015, 12 pages.
"International Search Report", Application No. PCT/US20013/071616, Mar. 5, 2014, 2 pages.
"International Search Report", Application No. PCT/US2014/014375, Apr. 7, 2014, 4 pages.
"Market & Motivation (MRD Section3) for Interoperability Testing of Neighbor Awareness Networking", WiFi Alliance Neighbor Awareness Networking Marketing Task Group, Version 0.14, 2011, 18 pages.
"Marketing Statement of Work Neighbor Awareness Networking", Version 1.17, Neighbor Awareness Networking Task Group, May 2012, 18 pages.
"Motorola SJYN0505A Stereo Push to Talk Headset for Nextel", Motorola Inc., iDEN 5-pole 2.5 mm Stereo Headset SJYN05058A, 2010, 2 pages.
"Non-Final Office Action", U.S. Appl. No. 12/650,699, Mar. 30, 2015, 28 pages.
"Non-Final Office Action", U.S. Appl. No. 12/650,699, Apr. 23, 2013, 19 pages.
"Non-Final Office Action", U.S. Appl. No. 12/650,699, Jul. 19, 2012, 12 pages.
"Non-Final Office Action", U.S. Appl. No. 12/650,699, Dec. 16, 2013, 26 pages.
"Non-Final Office Action", U.S. Appl. No. 13/477,609, Dec. 3, 2014, 7 pages.
"Non-Final Office Action", U.S. Appl. No. 13/477,609, Dec. 14, 2015, 9 pages.
"Non-Final Office Action", U.S. Appl. No. 13/692,520, Sep. 5, 2014, 15 pages.
"Non-Final Office Action", U.S. Appl. No. 13/692,520, Oct. 5, 2015, 17 pages.
"Non-Final Office Action", U.S. Appl. No. 13/721,771, May 20, 2015, 6 pages.
"Non-Final Office Action", U.S. Appl. No. 13/733,297, Feb. 2, 2016, 17 pages.
"Non-Final Office Action", U.S. Appl. No. 13/733,297, Mar. 13, 2015, 23 pages.
"Non-Final Office Action", U.S. Appl. No. 13/873,557, Mar. 11, 2015, 19 pages.
"Non-Final Office Action", U.S. Appl. No. 13/945,968, Apr. 28, 2015, 16 pages.
"Non-Final Office Action", U.S. Appl. No. 13/955,723, Dec. 17, 2015, 21 pages.
"Non-Final Office Action", U.S. Appl. No. 14/012,050, Feb. 10, 2015, 18 pages.
"Non-Final Office Action", U.S. Appl. No. 14/031,739, Aug. 18, 2015, 16 pages.
"Non-Final Office Action", U.S. Appl. No. 14/052,903, Mar. 11, 2015, 7 pages.
"Non-Final Office Action", U.S. Appl. No. 14/068,309, Oct. 2, 2015, 14 pages.
"Non-Final Office Action", U.S. Appl. No. 14/150,047, Jun. 29, 2015, 11 pages.
"Non-Final Office Action", U.S. Appl. No. 14/226,041, Jun. 5, 2015, 8 pages.
"Non-Final Office Action", U.S. Appl. No. 14/280,775, 07/16/215, 9 pages.
"Non-Final Office Action", U.S. Appl. No. 14/330,317, Feb. 25, 2016, 14 pages.
"Non-Final Office Action", U.S. Appl. No. 14/339,476, Jan. 20, 2016, 9 pages.

(56) References Cited

OTHER PUBLICATIONS

"Non-Final Office Action", U.S. Appl. No. 14/445,715, Jan. 15, 2016, 26 pages.
"Notice of Allowance", U.S. Appl. No. 12/650,699, Jan. 14, 2016, 8 pages.
"Notice of Allowance", U.S. Appl. No. 13/873,557, Dec. 23, 2015, 10 pages.
"Notice of Allowance", U.S. Appl. No. 13/945,968, Sep. 16, 2015, 6 pages.
"Notice of Allowance", U.S. Appl. No. 14/012,050, Dec. 14, 2015, 12 pages.
"Notice of Allowance", U.S. Appl. No. 14/052,903, Feb. 1, 2016, 8 pages.
"Notice of Allowance", U.S. Appl. No. 14/226,041, Dec. 31, 2015, 5 pages.
"Notice of Allowance", U.S. Appl. No. 14/488,709, Sep. 23, 2015, 10 pages.
"Pre-Brief Appeal Conference Decision", U.S. Appl. No. 12/650,699, Apr. 9, 2013, 2 pages.
"Restriction Requirement", U.S. Appl. No. 13/721,771, Mar. 16, 2015, 5 pages.
"Restriction Requirement", U.S. Appl. No. 14/031,739, Apr. 28, 2015, 7 pages.
"Supplemental Notice of Allowance", U.S. Appl. No. 14/488,709, Oct. 7, 2015, 8 pages.
Guo,"A Series-Shunt Symmetric Switch Makes Transmit-Receive Antennas Reconfigurable in Multipath Channels", IEEE 3d Int'l Conf. on Digital Object Identifier, May 29, 2011, pp. 468-471.
Li,"A Subband Feedback Controlled Generalized Sidelobe Canceller in Frequency Domain with Multi-Channel Postfilter", 2nd International Workshop on Intelligent Systems and Applications (ISA), IEEE, May 22, 2010, 4 pages.
MACCM"GaAs SP6T 2.5V High Power Switch Dual-/Tri-/Quad-Band GSM Applications", Rev. V1 data sheet, www.macomtech.com, Mar. 22, 2003, 5 pages.
Renesas,"uPG2417T6M GaAs Integrated Circuit SP6T Switch for NFC Application (R09DS0010EJ0100)", Rev. 1.00 data sheet, Dec. 24, 2010, 12 pages.
Tesoriero,"Improving Location Awareness in Indoor Spaces Using RFID Technology", Science Direct, Expert Systems with Applications, 2010, 894-898.
Valkonen,"Impedance Matching and Tuning of Non-Resonant Mobile Terminal Antennas", Aalto University Doctoral Dissertations, Mar. 15, 2013, 94 pages.
Vodafone"PDCCH Structure for MTC Enhanced Coverage", 3GPP TSG RAN WG1 #76, R1-141030, Prague, Czech Republic, Feb. 2014, 2 pages.
Yun,"Distributed Self-Pruning(DSP) Algorithm for Bridges in Clustered Ad Hoc Networks", Embedded Software and Systems; Lecture Notes in Computer Science, Springer, May 14, 2007, pp. 699-707.
Final Office Action, U.S. Appl. No. 14/150,047, Mar. 4, 2016, 14 pages.
Non-Final Office Action, U.S. Appl. No. 14/280,775, Mar. 23, 2016, 11 pages.
Notice of Allowance, U.S. Appl. No. 13/873,557, Apr. 11, 2016, 5 pages.
Notice of Allowance, U.S. Appl. No. 14/031,739, Mar. 1, 2016, 7 pages.
Supplemental Notice of Allowance, U.S. Appl. No. 14/031,739, Apr. 21, 2016, 2 pages.

* cited by examiner

METHOD AND PRECODER INFORMATION FEEDBACK IN MULTI-ANTENNA WIRELESS COMMUNICATION SYSTEMS

CROSS REFERENCE TO RELATED APPLICATIONS

The present application is a continuation application of U.S. patent application Ser. No. 13/924,838 filed on 24 Jun. 2013, that is a continuation of U.S. patent application Ser. No. 13/088,237 filed on 15 Apr. 2011, that claims priority to U.S. Provisional Patent Application No. 61/331,818 filed on 5 May 2010, the contents of all of which are incorporated herein by reference and from which benefits are claimed under 35 U.S.C. 119/120.

FIELD OF THE DISCLOSURE

The present disclosure relates generally to wireless communications and, more particularly, to a feedback framework in wireless communication systems.

BACKGROUND

In wireless communication systems, channel state information at a transmitter, for example, at a base station, is important for beam-forming transmissions (also referred to as precoding) that deliver more power to a targeted user while minimizing interference on other users. Precoding operations can be in the context of single-user multiple input multiple output (SU-MIMO) or multi-user MIMO (MU-MIMO), where two or more users are served by a single base station. An eNB needs accurate spatial channel information in order to perform a high rank transmission to a single UE or to perform precoding to two or more UEs simultaneously so that the mutual interference among multiple transmissions can be minimized at each UE.

Precoding operations may also be in the context of SU/MU-MIMO users served by coordinated multi-point (CoMP) transmissions where antennas belonging to different eNBs, rather than to the same eNB, can coordinate their precoding to serve multiple users simultaneously. Further support for up to eight transmit antennas is enabled in the next generation cellular standards like 3GPP LTE Release-10. Due to such a relatively large number of antennas (4-Tx or 8-Tx) involved in such transmissions, it is desirable that the UE feedback be designed efficiently with good performance overhead trade-off, so that feedback does not scale linearly with the increasing number of antennas.

The antenna configurations which support a large number of antennas in practice must allow large beamforming gains and also larger spatial multiplexing gains achieved from higher rank transmission. Beamforming allows efficient support for low geometry users and also for multi-user transmission thereby improving cell-edge and cell-average throughput with larger number of users in the system, while spatial multiplexing allows higher peak spectral efficiency. A typical antenna configuration to achieve this would be to have groups of antennas where each group is a set of correlated antennas and each group is uncorrelated with the other groups. A cross-polarized antenna configuration is one such setup. The correlated antenna elements provide the required beamforming gains and the uncorrelated antenna elements enable high rank transmissions.

The above structure in the antennas has some unique spatial characteristics that can be exploited. For example, the correlation among correlated antennas changes slowly and is confined to a smaller vector space on an average. This can be used to feedback the correlated and uncorrelated channel characteristics, i.e., two components, at different rates and/or with different levels of quantization/overhead in time and frequency to reduce feedback overhead. One of the components representing the correlated channel characteristics can be fed back on a wideband basis and/or slowly in time, while the other component is fed back on a subband basis and/or more frequently in time.

However, one of the key challenges in designing such a two component feedback system is identifying the parameters used in the two components and the construction of the final precoder matrix as a function of the two components.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
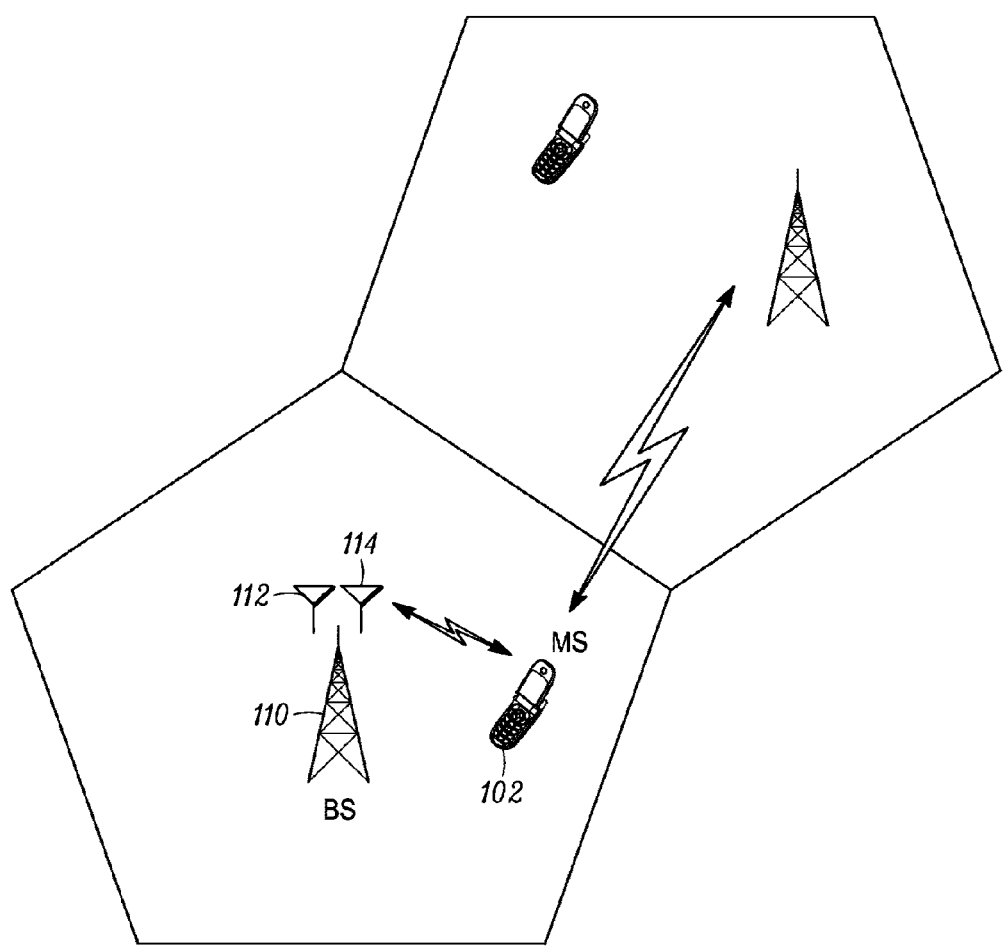
FIG. 1 illustrates a wireless communication system.

In FIG. 1, a wireless communication system 100 comprises one or more fixed base infrastructure units 110 and 120 forming a network distributed over a geographical region for serving remote units in the time and/or frequency domain. The base infrastructure unit may also be referred to as the transmitter, access point (AP), access terminal (AT), base, base station (BS), base unit (BU), Node-B (NB), enhanced Node-B (eNB), Home Node-B (HNB), Home eNB (HeNB) or by other terminology used in the art. The base units are generally part of a radio access network that includes one or more controllers communicably coupled to one or more corresponding base units. The access network is generally communicably coupled to one or more core networks, which may be coupled to other packet or data networks, like the Internet, and to public switched telephone networks (PSTN), among other networks. These and other elements of access and core networks are not illustrated but they are well known generally by those having ordinary skill in the art.

The one or more base units each comprise one or more transmitters for downlink transmissions and one or more receivers for receiving uplink transmissions from the remote units as described further below. The one or more base units serve a number of remote units, for example, remote unit 102 and 104 in FIG. 1, within a corresponding serving area, for example, a cell or a cell sector of the base unit, via a wireless communication link. The remote units may be fixed units or wireless communication devices. The remote unit may also be referred to as a receiver, subscriber station (SS), mobile, mobile station (MS), mobile terminal, user, terminals, user equipment (UE), user terminal (UT) or by other terminology used in the art. The remote units also comprise one or more transmitters and one or more receivers. In FIG. 1, the base unit 110 transmits downlink communication signals to serve remote unit 102 in the time and/or frequency domain. The remote unit 102 communicates directly with base unit 110 via uplink communication signals.

The term "transmitter" is used herein to refer to a source of a transmission intended for receipt by a user or receiver. A transmitter may have multiple co-located antennas each of which emits, possibly different, waveforms based on the same information source. In FIG. 1, for example, antennas 112 and 114 are co-located. A transmitter is typically associated with a cell or a cell sector in the case of a base unit having or serving multiple sectors. Also, if a base unit has geographically separated antennas (i.e., distributed antennas with remote radio heads), the scenario is also referred to as "a transmitter". Thus generally one or more base units transmit information from multiple antennas for reception by a remote unit.

Figure 2:
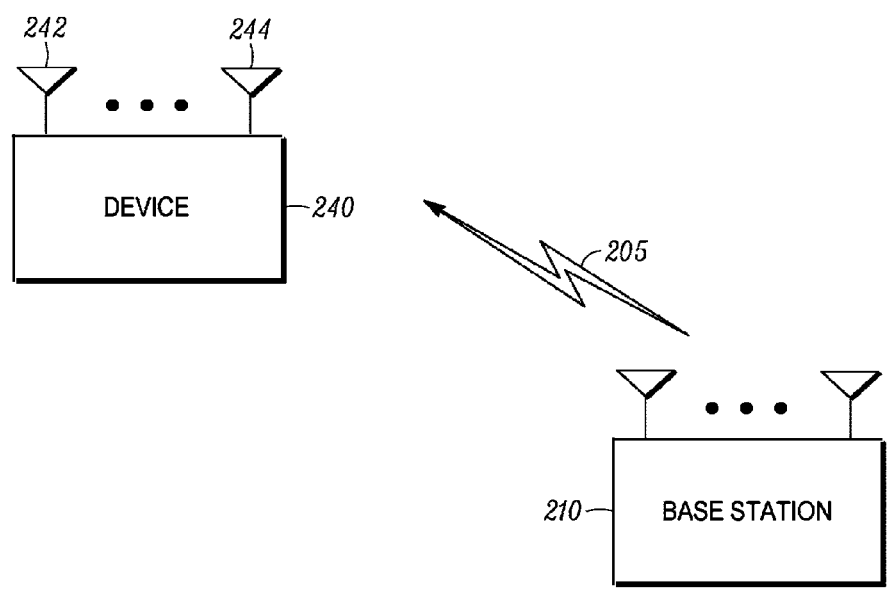
FIG. 2 illustrates an embodiment with a base station transmitting to a device.

In the diagram 200 of FIG. 2, at 210, a base unit transmits from a plurality of antennas. Also in FIG. 2, a remote unit receives transmissions from a plurality of antennas, which may or may not be co-located. In a typical embodiment, a base unit may be associated with a cell-ID, by which it identifies itself to a remote unit. As a conventional mode of operation, also sometimes referred to as a single-point transmission scheme, a remote unit 240 receives transmissions from a plurality of antennas of a single base unit 210. Such a base unit is also referred to as a serving cell (or serving base unit) to the user device/remote unit.

In one implementation, the wireless communication system is compliant with the Third Generation Partnership Project (3GPP) Universal Mobile Telecommunications System (UMTS) Long Term Evolution protocol, also referred to as Evolved Universal Terrestrial Radio Access (EUTRA), or some future generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. In another implementation, the wireless communication system is compliant with the IEEE 802.16 protocol or a future generation thereof. More generally, however, the wireless communication system may implement some other open or proprietary communication protocol where channel feedback is useful or desired. Thus the disclosure is not intended to be limited to or by the implementation of any particular wireless communication system architecture or protocol. The teachings herein are more generally applicable to any system or operation that utilizes multiple antennas in a transmission, whether the multiple antennas belong to a single base unit or to multiple base units or whether the multiple antennas are geographically co-located (e.g., belong to a single base unit) or distributed (belong to either remote radio heads or multiple cells).

In a general embodiment, pilots or reference symbols are sent from each antenna in a transmitter. These pilots occupy the operational bandwidth to allow users to estimate the channel state information (CSI) of the entire bandwidth. Typically the pilots from different antennas are orthogonal so the pilots do not interfere with each other. Such orthogonality can be ensured if the pilots are sent using different time and/or frequency resources or code resources. For example, in systems based on OFDM technology, the pilots can occupy different subcarriers in frequency or different OFDM symbols in time or share the same set of resources, but different code sequences.

Figure 3:
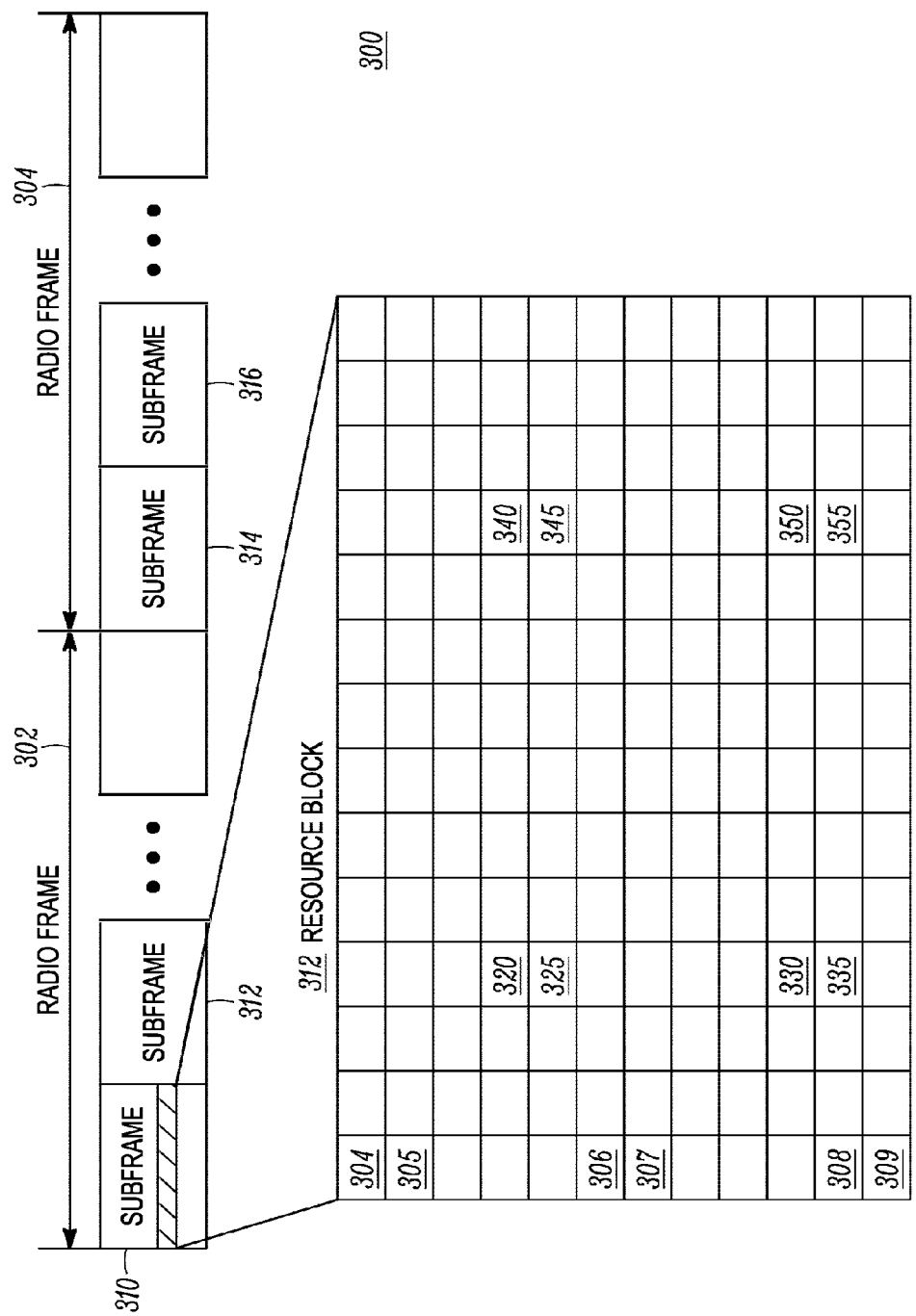
FIG. 3 illustrates an example of a frame structure used in the 3GPP LTE Release-8 (Rel-8) specification and different reference symbols.

In FIG. 3 illustrates a frame structure used in the 3GPP LTE Release-8 (Rel-8) protocol to illustrate a possible reference symbol (RS) pattern in an OFDM system. A subframe 310 in a radio frame 302 spans 14 OFDM symbols in time. Further a subframe 310 contains multiple resource blocks 312, each spanning 12 consecutive subcarriers in frequency. In typical OFDM based systems like 3GPP LTE, a block of consecutive OFDM symbols are referred to as a subframe. Each sub-carrier location in each of the OFDM symbols is referred to as a resource element (RE), since a single data modulation symbol can be mapped to such a resource element. A resource block (RB) is defined as a block of REs comprising a set of consecutive sub-carrier locations in frequency and a set of symbols. In LTE Rel-8, a slot is defined to span 7 symbols and each subframe is made of two slots, and hence 14 symbols. A minimum resource unit allocated to a user is the two RBs corresponding to two slots in a subframe for a total of 2×12×7 REs. A resource block may be more generally defined as a set of resource elements/OFDM subcarrier resources in time and frequency domain.

Figure 4:
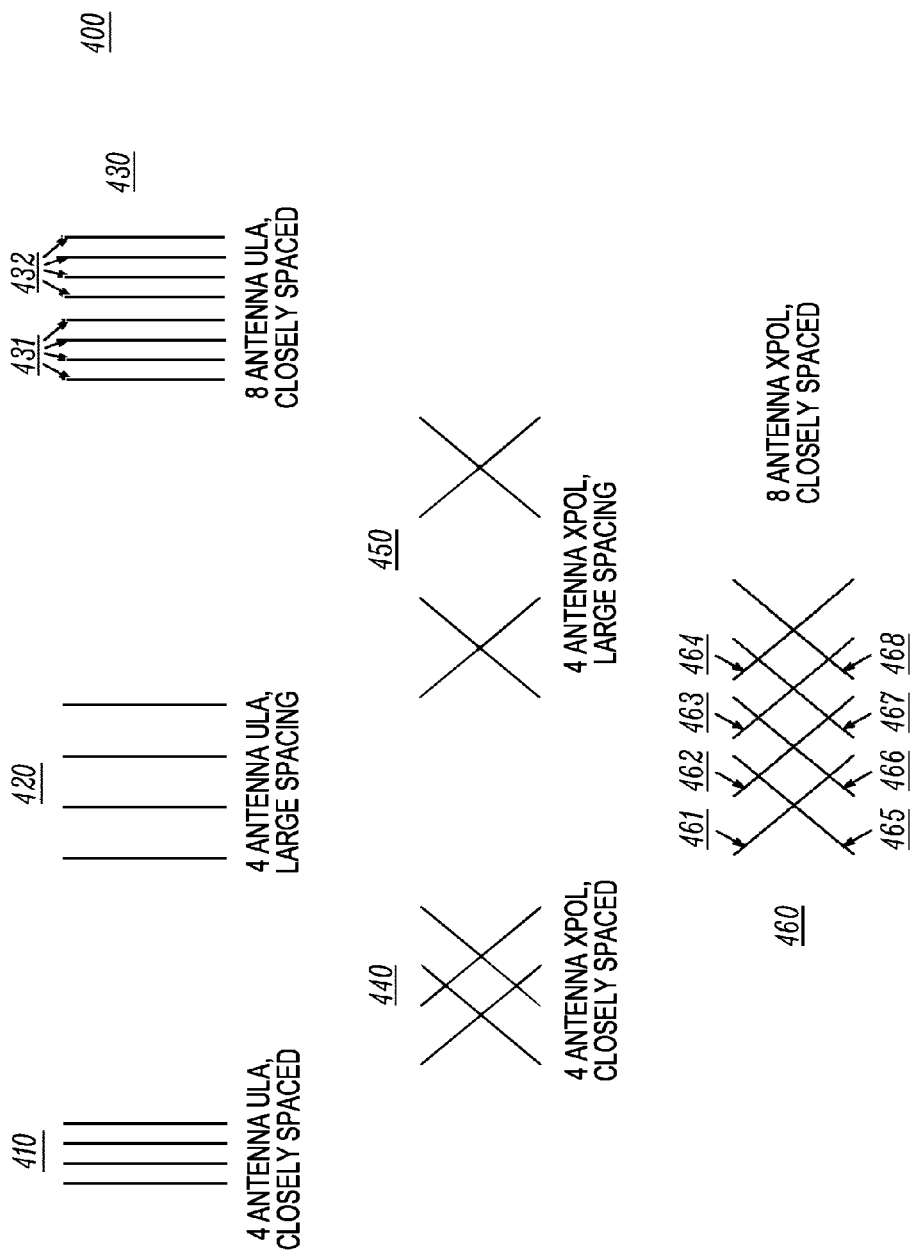
FIG. 4 illustrates exemplary antenna configurations at a base unit.

Some of the REs in a RB are reserved for reference symbols (also referred to as pilots) to help in the demodulation and other measurements at the UE. These reference symbols, as defined in Release 8 specification of LTE can be further divided into two types. The first type is cell-specific reference symbols, which are cell-specific and "common" to all users, and are transmitted in all the RBs. A common reference symbol (CRS) may or may not correspond to actual physical antennas of the transmitter, but CRSs are associated with one or more antenna "ports", either physical or virtual. In FIG. 3, as an example only, RE 304, 305, 306, 307, 308 and 309 may be a CRS. The second type is user-specific or a dedicated reference symbol (DRS), which are user-specific and hence applicable only to that user, and allocated in the RB's allocated to that user's data. Furthermore, DRS typically correspond to "precoded" or beam-formed RSs, which can be directly used by a user for the demodulation of the data streams. The precoding operation is explained later. In FIG. 4, as an example only, RE 320, 325, 330, 335, 340, 345, 350 and 355 may be a DRS. In LTE Release-10, a new spare RS, namely CSI-RS are defined to enable channel measurements, while DRSs are primarily relied upon for demodulation. These can be used similar to CRSs in LTE Release-8 to derive channel feedback information.

The location of the reference symbols is known to the UE from higher layer configurations. For example, depending on the number of antenna ports as configured by a transmission unit, UE knows the location of all the reference symbols corresponding to all configured antenna ports. As another example, when a UE is instructed to use a DRS, the UE also knows the DRS locations, which may depend on the user identification.

In typical FDD operation of a LTE Rel-8 system, CRSs are used for both channel related measurements at the UE and also for demodulation. If eNB employs a precoder at the transmitter, such information is made available to the UE, which allows it to construct the channel for demodulation based on the CRSs. In a FDD operation of a future LTE Rel-10 system, CSI-RS (and possibly CRSs that may still be available) may be used for channel related measurements, while DRSs are used for demodulation. Hence an eNB may apply precoder which are not exactly the same as the UE feedback, and does not have to signal the precoder explicitly. This is further described in detail later.

The "precoding" operation is explained in the following. The base station transmits a signal via weighting each antenna signal with a complex value, an operation referred to as precoding, which may be mathematically represented by the matrix equation:

$$Y = HVs + n$$

in which, when transmitting one spatial layer of data, or rank-1, may be represented as:

$$\begin{bmatrix} y_1 \\ \vdots \\ y_{N_R} \end{bmatrix} = \begin{bmatrix} h_{1,1} & \cdots & h_{1,N_T} \\ \vdots & \ddots & \vdots \\ h_{N_R,1} & \cdots & h_{N_R,N_T} \end{bmatrix} \begin{bmatrix} v_1 \\ \vdots \\ v_{N_T} \end{bmatrix} s + n$$

in which, when transmitting two spatial layers of data, or rank-2, may be represented as:

$$\begin{bmatrix} y_1 \\ \vdots \\ y_{N_R} \end{bmatrix} = \begin{bmatrix} h_{1,1} & \cdots & h_{1,N_T} \\ \vdots & \ddots & \vdots \\ h_{N_R,1} & \cdots & h_{N_R,N_T} \end{bmatrix} \begin{bmatrix} v_{1,1} & v_{1,2} \\ \vdots & \vdots \\ v_{N_T,1} & v_{N_T,2} \end{bmatrix} \begin{bmatrix} s_1 \\ s_2 \end{bmatrix} + n$$

where $y_1 \ldots y_{N_R}$ may be the received data at the UE receive antenna #1 to #$N_R$, respectively. In the example with a rank-1 transmission, or a transmission with one data stream denoted as "s", the Matrix V may be a precoding vector with weights $v_{1,1} \ldots v_{N_T,1}$ for base station transmit antenna #1 to #$N_T$ respectively. In an embodiment with a rank-2 transmission, or a transmission with two data streams s1 and s2 on the same subcarrier, V may be a precoding matrix. Precoding vector and precoding matrix can be referred to as precoding matrix given vector is a degenerated case of matrix.

Matrix H may be the propagation channel matrix between transmit antennas and receive antennas with entry $h_{ij}$ representing a channel between the jth transmit and ith receive antennas. Value n may represent noise and interference. The precoding weights V, either a vector or matrix, may be determined by the base station, typically based on the channel particular to the UE or can be UE-specific and may also take into account a preference indicated by feedback from the UE. Further the matrix HV can be referred to as the effective channel between a user's data streams and its receivers. The effective channel, instead of the propagation channel H, is all a UE needs for demodulation purposes. The precoding weights may or may not be constrained to a predefined codebook that consists of a set of pre-defined vectors or matrices. In an embodiment with constrained precoding, the precoding matrix may be signaled by the base unit efficiently with a precoding matrix index (PMI) or with an index to a precoding matrix within a predefined codebook. The term "matrix" in this context may include the degenerated special case of vector, which applies to single stream transmission. In the most generic sense, the term "precoding" refers to any possible transmission scheme that may be deemed as mapping a set of data streams to an antenna set using a matrix V.

The applied precoding could be based on corresponding feedback from the UE or channel measurements at a base station. In a simple single-user single base unit scheme, one set of DRSs could be defined corresponding to the effective precoded channel (i.e., "HV" in the above equation). If two streams are transmitted to a user in a rank-2 transmission, then only 2 DRS ports (i.e., 2 subsets of DRS each corresponding to a precoded antenna port) are sufficient, even though the actual signal transmission may come from all the $N_T$ antennas at the base unit where $N_T$ can be greater than 2. In FIG. 3, as an example only, RE 320, 340, 330 and 350 may correspond to one DRS port while RE 325, 345, 335 and 355 may correspond to another DRS port.

In a future migration of a system, for example in 3GPP LTE Release 10 and beyond, user-specific RS (or DRS) are expected to be used widely with advanced Multiple-Input Multiple-Output (MIMO) modes like Coordinated Multi-point transmission (CoMP) and multi-user (MU) MIMO modes described earlier. As described earlier, DRSs are sufficient to enable demodulation. This is also helpful since an eNB is not required to signal exact transmission parameters like precoders, co-ordinating points, etc. However, an estimate of the actual (un-precoded or explicit) channel is required at the eNB to derive such transmission parameters. So as mentioned before, feedback measurements for this purpose are enabled in LTE Release-10 by defining lower density reference signals specifically for the purpose of feedback measurements (CSI-RS). Since they do not need to support demodulation, like CRS in LTE Release 8, a lower density is sufficient. Further, with CoMP, CSI-RS may be setup to enable measurements at the user device on a plurality of antennas from multiple base units. In FIG. 3, as an example only, RE 304, 305, 306, 307, 308 and 309 may also be CSI-RS.

From either CRS or CSI-RS, the remote unit receiver can estimate the CSI. For the OFDM example, the receiver estimates CSI at each subcarrier between each receiver antenna and each transmitter antenna. The CSI may be denoted as a channel matrix on a sub-carrier k represented by $$H_k = \begin{bmatrix} h_{11} & h_{12} & \cdots & h_{1Nt} \\ h_{21} & \cdots & \cdots & \cdots \\ \cdots & \cdots & \cdots & \cdots \\ h_{Nr1} & \cdots & \cdots & h_{NrNt} \end{bmatrix}$$

where $h_{ij}$ is the channel matrix from jth transmit antenna to the ith receive antenna.

A correlation between antenna port i and antenna port j may be computed as follows $$R = \frac{1}{|S|} \sum_{k \in S} h_{ki}^* h_{kj}$$

where $h_{ki}$ is the channel measured corresponding to antenna port i on subcarrier k, S is a set of subcarriers, typically corresponding to the whole operational bandwidth (denoted as $R_{WB}$) or a sub-band/narrowband (denoted as $R_{NB}$).

More generally, an antenna correlation matrix that represents the spatial covariance among a plurality of transmit antennas can be computed as follows $$R = \frac{1}{|S|} \sum_{k \in S} H_k^H H_k = \begin{bmatrix} R_{11} & \cdots & \cdots & R_{1,Nt} \\ \cdots & \cdots & \cdots & \cdots \\ \cdots & \cdots & \cdots & \cdots \\ R_{Nt,1} & \cdots & \cdots & R_{Nt,Nt} \end{bmatrix}$$

The Eigen Decomposition of R may be expressed in a well-defined format as $$VDV^H \tag{1}$$

where V is a unitary matrix of Eigen vectors, where the first column is the most dominant vector, the second column the second dominant vector and so on. D is a diagonal matrix with diagonal entries as Eigen values of R. The full knowledge of R at the transmitter will enable advanced beamforming/precoding techniques that will improve spectral efficiency and system throughput. However, the overhead may be large and approximations suitable to the transmission mode are applied.

For SU-MIMO precoding, the Eigen space information as represented by V above can be viewed as optimal precoding transmission weights in a capacity maximizing sense.

Existing 4$^{th}$ Generation (4G) air interfaces (i.e., 3GPP LTE and IEEE 802.16e) already support beamforming operation via the precoding operation as described earlier. To support precoding operation from the base station, a user terminal will be reporting back to the base station a preferred Precoding Matrix Index (PMI) which is an index to a set of predetermined precoding matrices. The recommended precoding matrix is obtained at the user terminal based on a certain metric such as maximizing the post-precoding link quality or throughput and is selected from one of the quantized codebook entries, wherein the codebook is known to the transmitter and the receiver. Specifically, the standard requires the UE to feedback the PMI that supports a MCS (modulation and coding scheme) with the highest rate, while satisfying a probability if block error target. In future releases, different or more explicit definitions of PMI may be defined. However, in general, the preferred PMI approximately represents a vector quantization of the dominant Eigenspace of R. Further PMI is feedback with an associated rank and as such PMI is an quantized approximation of V(1:r), where 'r' is the rank.

FIG. 4 illustrates some exemplary antenna configurations at a base unit. A closely spaced ULA, with a typical spacing of 0.5 to 1 wavelengths, is illustrated in 410. A large spaced ULA with typical spacing of 4 to 10 wavelengths is illustrated in 420. A cross-polarized configuration with two sets of cross-poles each with two antennas at +/−45 polarizations is illustrated in 440. Depending on the configuration, the correlation between different antenna elements may have a certain structure. Some exemplary cases are described herein.

We now illustrate how the structure of the antenna configuration can be used to develop efficient precoder structures.

One of the structures that can be exploited is a Kronecker based approximation of the channel covariance. For example, an 8×8 long term covariance matrix corresponding to 8 antennas, as in FIG. 4 at 460, for the transmitter can be approximated as a Kronecker product of a 4×4 correlation matrix corresponding to the ULA and a 2×2 correlation matrix, corresponding to the cross-polarized component i.e., $$R = R_{XPOL} \otimes R_{ULA}$$

Conceptually, the ULA Kronecker component $R_{ULA}$ captures the correlation submatrix between two non-overlapping subsets of antennas with similar ULA configuration, which in FIG. 4 at 460 are antenna sets (461-464) and (465-468). The polarization Kronecker component $R_{Pol}$ captures the correlation submatrix between subsets with similar cross-polarized configuration, namely antenna subsets (461,465), (462,466), (463,467) and (464,468) in FIG. 4. More generally, the spacing/location and polarization of antenna elements introduce some redundant structure in the antenna correlation, which lead to good Kronecker approximations and can be used as effective compression schemes for feedback overhead reduction. The above representation in the covariance matrix also translates to similar structure for the precoder.

Even for ULA, the transmit antennas can also be divided into two non-overlapping subsets of antennas. An example is shown in FIG. 4 for subset 431 and 432.

The final precoder for SU-MIMO rank-r may be computed as $$V = SVD(R_{XPOL,b} \otimes R_{ULA,WB}) \tag{0.2}$$

The principal Eigen vectors and Eigen values of the constructed matrix are related to that of the Kronecker components as $$D = \text{permute}(D_{XP} \otimes D_{ULA})$$

$$V = \text{permute}(V_{XP} \otimes V_{ULA}) \tag{0.3}$$

where the "permute" operation performs re-ordering of Eigen values.

We can further illustrate how the reordering influences the structure of the precoder for a 4 Tx cross-pole as an example, where both the ULA and cross-pole sub-matrices are of size 2×2, i.e., $$R_{ULA} = [v_{ula,1}, v_{ula,2}] \begin{bmatrix} \lambda_1 & 0 \\ 0 & \lambda_2 \end{bmatrix} [v_{ula,1}, v_{ula,2}]^H \tag{0.4}$$

$$R_{XP} = [v_{xp,1}, v_{xp,2}] \begin{bmatrix} \kappa_1 & 0 \\ 0 & \kappa_2 \end{bmatrix} [v_{xp,1}, v_{xp,2}]^H \tag{0.5}$$

Let us consider a rank-2 SU-MIMO transmission as a further example. Typically the cross-pole covariance matrix is highly rank-2 and ULA covariance can be approximated as rank 1. To express it quantitatively, if the two Eigen values ratios satisfy $$\frac{\lambda_1}{\lambda_2} > \frac{\kappa_1}{\kappa_2},$$

then the rank-2 SU-MIMO precoder, after corresponding re-ordering, can be approximated as $$[v_{xp,1} \quad v_{xp,2}] \otimes v_{ula,1} = \begin{bmatrix} v_{ula,1}v_{xp,11} & v_{ula,1}v_{xp,21} \\ v_{ula,1}v_{xp,12} & v_{ula,1}v_{xp,22} \end{bmatrix} \tag{0.6}$$

On the other hand, in case of $$\frac{\lambda_1}{\lambda_2} < \frac{\kappa_1}{\kappa_2}$$

(which is less likely but could occur on short-term basis, like a subband of contiguous subcarriers), then the rank-2 precoder may be approximated as $$[v_{xp,1}] \otimes [v_{ula,1} \quad v_{ula,2}] = \begin{bmatrix} v_{ula,1}v_{xp,11} & v_{ula,2}v_{xp,11} \\ v_{ula,1}v_{xp,12} & v_{ula,2}v_{xp,12} \end{bmatrix} \tag{0.7}$$

As can be seen, two structures are shown which allow expressing the overall precoder as a Kronecker product of two precoders. Further, the ULA component of the precoder may be feedback at a different time/frequency granularity than the cross-pole component of the precoder, and allows two component feedback schemes.

Though the Kronecker representation leads to an elegant separation to two component precoders and is one way to achieve two-component feedback, it also imposes some limitations, where either the ULA or the cross-pol component is assumed to be rank 1 for deriving an overall rank-2 precoder. In general, however a more general two-component precoder structure is useful for higher ranks, which will be further discussed below.

For the purpose of discussion, we will assume the long-term/correlated component corresponds to a wide frequency band such as the whole system bandwidth and the short-tem component corresponds to a subband/narrowband that is composed of a set of contiguous subcarriers and is a part of the wideband.

The optimal precoding vector V (optimal in an information theoretic capacity maximizing sense) can be obtained from the Eigen decomposition of the narrowband covariance matrix for band indexed 'b' as follows.

$$R_{NB,b} = V_{NB,b} D_{NB,b} V_{NB,b}^H \quad (0.8)$$

For the rank-2 or 2-layer precoder, the ideal precoder is simply the first two columns of $V_{NB,b}$. Let us denote the rank-2 Eigen decomposition based precoder as follows (a partition based representation of $V_{NB,b}$)

$$\begin{bmatrix} v_{11} & v_{12} \\ v_{21} & v_{22} \end{bmatrix} \quad (0.9)$$

where $v_{ij}$ is a 4×1 (assuming 8-Tx eNB) vector. Clearly, each block corresponds to a vector of weights applied on a subset of antennas (e.g., ULA subset) corresponding to one spatial layer of data stream.

In a preferred embodiment, we approximate or otherwise represent $V_{NB,b}$ as $$\begin{bmatrix} v_{11}\gamma_{11} & v_{12}\gamma_{12} \\ v_{21}\gamma_{21} e^{j\theta_1} & v_{22}\gamma_{22} e^{j\theta_2} \end{bmatrix} \quad (0.10)$$

and then we can impose the constraint $\|v_{11}\|=\|v_{12}\|=\|v_{21}\|=\|v_{22}\|=1$ and $\gamma_{ij}$ are real values and $\theta_1, \theta_2 \in [0, 2\pi]$.

Clearly, the above precoder representation is based on a matrix with a block of sub-matrices, where each sub-matrix is represented with a vector multiplied with a scalar. More importantly, each sub-matrix corresponds to transmission from a subgroup of antennas, and as one special case, where they all have the same polarization.

Figure 5:
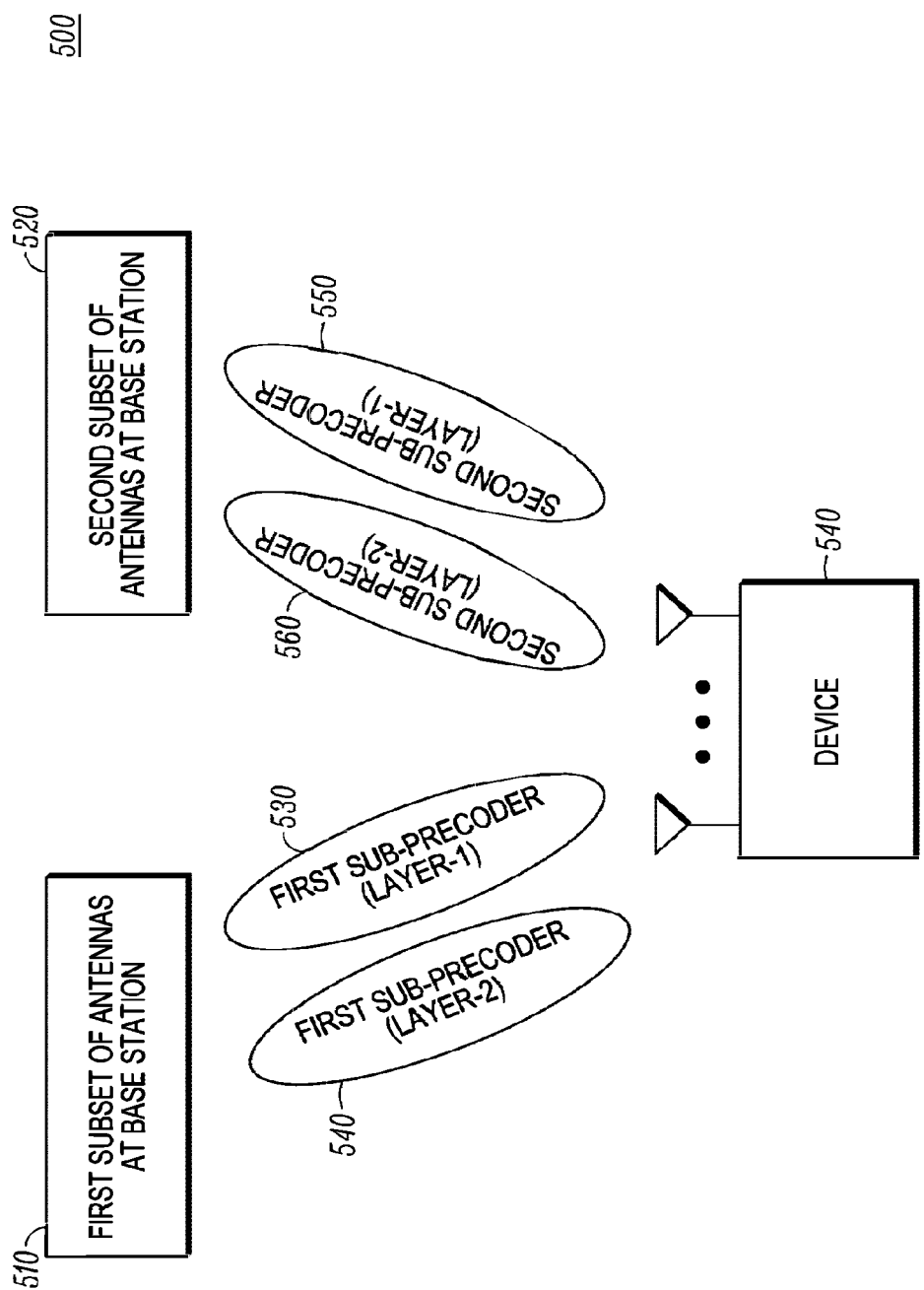
FIG. 5 illustrates a first subset of antennas and a second subset of antennas transmitting two spatial layers to a device.

FIG. 5 further describes the above precoding operation from two subsets of antennas. Two non-overlapping subsets of antennas 510, 520 are weighted by a first and a second sub-precoder matrix, respectively. Each sub-precoder matrix corresponds to one or more spatial layers of data transmission, for example in FIG. 5, the first sub-precoder is for spatial layer 1 (530) and layer-2 (540). Similarly for the second-precoder, it corresponds to two spatial layers. Mathematically, as an example with eight antennas composed of two groups of 4 antennas, where the first subgroup is number 1-4, and second subgroup numbered 5-8, a rank r precoder may be expressed as follows $$\begin{bmatrix} v_{11} & v_{12} & \cdots & v_{1r} \\ v_{21} & \cdots & \cdots & \cdots \\ v_{31} & \cdots & \cdots & \cdots \\ v_{41} & \cdots & \cdots & v_{4r} \\ v_{51} & v_{52} & \cdots & v_{5r} \\ v_{61} & \cdots & \cdots & \\ v_{71} & \cdots & \cdots & \cdots \\ v_{81} & \cdots & \cdots & v_{8r} \end{bmatrix} \quad (11)$$

In the above the first sub-precoder is the top 4 rows (1-4) and the second sub-precoder is the bottom 4 rows (5-8)

A precoder matrix of one or more vectors associated with one or more spatial layers consists of a first sub-precoder matrix, which comprises of a first set of weights on a first subsets of transmit antennas of the base station, and a second sub-precoder matrix which comprises of a second set of weights on a second subset of transmit antennas of the base station as illustrated above. The set of weights here can be for one or more spatial layers of transmission.

In the final precoder matrix, the first sub-precoder matrix is one or more column vectors, which are of length equal to the number of antennas in the first subgroup, multiplied by one or more scalars. Similarly for the second sub-precoder.

For practical reasons, it is often preferred to have the precoder satisfy two constraints, namely i) Full power utilization on each transmit antenna, for maximum Power Amplifier (PA) use and ii) Equal power on each transmitted stream. These constraints can be imposed on the precoder structure $V_{NB,b}$. To satisfy equal power constraint on each transmit stream, we can impose additional constraint of $\gamma_{11}+\gamma_{21}=\gamma_{12}+\gamma_{22}$. To satisfy full power utilization on each individual transmit antenna, we could impose as a sufficient condition, that $\gamma_{11}+\gamma_{12}=\gamma_{21}+\gamma_{22}$ and that $v_{ij}$ are constant modulus vectors. With these constraints, we have another preferred embodiment of the precoder structure as follows, $$\begin{bmatrix} v_{11}\rho & v_{12}\sqrt{1-\rho^2} \\ v_{21}\sqrt{1-\rho^2}\, e^{j\theta_1} & v_{22}\rho e^{j\theta_2} \end{bmatrix},$$

$$\theta_1, \theta_2 \in [0, 2\pi], \rho^2 \in [0, 1]$$

The above discussion on the precoder structure is tied to feedback method in this invention. In the feedback scheme for a wireless communication device to send a precoder matrix information to a base station, the wireless communication device sends a first representation of a first matrix chosen from a first codebook, wherein the first matrix has at least two column vectors. The wireless communication device sends a second representation of a second matrix chosen from a second codebook, wherein the first representation and the second representation together convey a precoder matrix of one or more vectors associated with one or more spatial layers. The precoder matrix comprises a first sub-precoder matrix including a first set of weights on a first subsets of transmit antennas of the base station and a second sub-precoder matrix including a second set of weights on a second subset of transmit antennas of the base station. The first sub-precoder matrix is one or more column vectors of the first matrix corresponding to the first representation, multiplied by one or more entries of the second matrix corresponding to the second representation, and the second sub-precoder matrix is one ore more column vectors of the first matrix corresponding to the first representation, multiplied by one or more entries of the second matrix corresponding to the second representation.

The two-component feedback conveys the information of a precoder matrix recommended by the user to the base station. The actual precoder used by the base station may be different from the suggested precoder, but the actual precoder is derived from the recommended feedback.

We can use the embodiment above to describe a particular example here. A user feeds back a representation of a first chosen matrix that has a set of vectors $v_{11}$, $v_{12}$, $v_{21}$, $v_{22}$, wherein the representation can be just the index of the chosen matrix within a codebook. Then, the user feeds back a representation of a second matrix of the form of $$\begin{bmatrix} \rho & \sqrt{1-\rho^2} \\ \sqrt{1-\rho^2}\, e^{j\theta_1} & \rho e^{j\theta_2} \end{bmatrix},$$

also as index within a codebook format. The precoder information conveyed by these two representations corresponds to a final precoder matrix defined by $$W = \begin{bmatrix} v_{11}\rho & v_{12}\sqrt{1-\rho^2} \\ v_{21}\sqrt{1-\rho^2}\, e^{j\theta_1} & v_{22}\rho e^{j\theta_2} \end{bmatrix}.$$

In one embodiment, the vector $v_{ij}$ could be selected from a constant modulus codebook. One embodiment is a codebook of DFT vectors described below. Alternatively, one could consider a codebook expanded to include some non-DFT vectors.

A DFT codebook can be described as $$v_{ij} \in \left\{ \begin{bmatrix} 1 & e^{\frac{2\pi j n}{N_1}} & e^{\frac{2\pi j \cdot 2n}{N_1}} & \cdots & e^{\frac{2\pi j \cdot Ln}{N_1}} \end{bmatrix}^T, n = 0, 1, \ldots N_1 = 2^{B_1} - 1 \right\},$$

which requires B1 bits for representation. L could be Nt/2 for the cross-pole configuration described.

Further, each column of the second matrix can be considered as a co-phasing vector that aligns the phase of the transmission using the first sub-precoder and the second sub-precoder. In the case of $\rho^2=0.5$ which results in the same amplitude of the entries of the second matrix, we can define another codebook from which the co-phasing vectors are allowed to choose, and an example of the co-phasing codebook is $$[1\ e^{j\theta_i}] \in \left\{ \begin{bmatrix} 1 & e^{\frac{2\pi j n}{N_2}} \end{bmatrix}^T, n = 0, 1, \ldots N_2 = 2^{B_2} - 1 \right\},$$

with B2 bits of representation.

More importantly, the above structure can also take advantage of wideband properties. For example, one can observe that $v_{ij}$ are constrained in vector space to a set of entries in the codebook that are highly related to the Eigen space of the ULA component (more specifically the covariance matrix $R_{ULA}$ among the correlated antennas). Similarly the amplitude factor $\rho$ is also related to the Eigen Spread $\lambda_1/\lambda_2$. The co-phasing is expected to change more on a subband basis as it relates to the phase alignment between cross-pol groups of antennas.

A preferred embodiment of implementation of two-component feedback is described by adapting $v_{11}$, $v_{12}$, $v_{21}$, $v_{22}$. The general adaptation can take the following steps of i) Feedback of a set of vectors $\{v_{11}^{wb}, v_{12}^{wb}, v_{21}^{wb}, v_{22}^{wb}\}$ in the form of codebook entries on a wideband basis, and ii) Feed back a representation of a rotation matrix $\omega_{ij}$ to rotate the wideband vector to arrive at the subband vector (i.e., sub-precoder vector that is suitable for the particular sub-band of interest). The rotation matrix is also in the form of a codebook and is typically smaller in size. The co-phasing and the amplitude scalar $\rho$ are feedback on a subband basis.

An exemplary embodiment is further described below, where a DFT codebook is used for the wideband vectors and an oversampled DFT based codebook is used for the rotation codebook. As a special case, K can be set to one.

$$v_{ij}^{wb} \in \left\{ \begin{bmatrix} 1 & e^{\frac{2\pi j n}{N_1}} & e^{\frac{2\pi j \cdot 2n}{N_1}} & \cdots & e^{\frac{2\pi j \cdot Ln}{N_1}} \end{bmatrix}^T, n = 0, 1, \ldots N_1 = 2^{B_1} - 1 \right\}$$

$$v_{ij}^{nb} = \omega_{ij} v_{ij}^{wb}$$

$$\omega_{ij} \in CB_{ij} = \left\{ \mathrm{diag}\left( \begin{bmatrix} 1 & e^{\frac{2\pi j n}{N_1 K}} & e^{\frac{2\pi j \cdot 2n}{N_1 K}} & \cdots & e^{\frac{2\pi j \cdot Ln}{N_1 K}} \end{bmatrix}^T \right), \right.$$

$$\left. n = -2^{B_2-1} = -N_2/2, -(N_2/2-1), \ldots 0 \ldots, N_2/2 - 1 \right\}$$

Another alternate representation of the above is $$v_{ij}^{wb} \in \left\{ \begin{bmatrix} 1 & e^{\frac{2\pi j n}{N_1}} & e^{\frac{2\pi j \cdot 2n}{N_1}} & \cdots & e^{\frac{2\pi j \cdot Ln}{N_1}} \end{bmatrix}^T, n = 0, 1, \ldots N_1 = 2^{B_1} - 1 \right\}$$

$$v_{ij}^{nb} = \mathrm{diag}(v_{ij}^{wb})\omega_{ij}$$

$$\omega_{ij} \in CB_{ij} = \left\{ \left( \begin{bmatrix} 1 & e^{\frac{2\pi j n}{N_1 K}} & e^{\frac{2\pi j \cdot 2n}{N_1 K}} & \cdots & e^{\frac{2\pi j \cdot Ln}{N_1 K}} \end{bmatrix}^T \right), \right.$$

$$\left. n = -2^{B_2-1} = -N_2/2, -(N_2/2-1), \ldots 0 \ldots, N_2/2 - 1 \right\}$$

In a variation of the above embodiment, the codebook for the wideband vectors and/or rotation matrix may include some non-DFT vectors in addition to DFT vectors.

In a more general embodiment, the rotation codebook may also be further defined dependent on the original codebook entry or a combination of dependent and independent entries. Note that above embodiment uses an independent and fixed codebook.

The main objective of the above representation is to use more feedback bits to capture the wideband information and used fewer bits to capture subband information. An exemplary embodiment is to use a 2 bit codebook for subband vectors and a 4 or 6 bit codebook to represent the wideband entries. In general, the selection of $(B_1, B_2)$ may depend on the feedback mode. More specifically, it could depend on the number of sub-bands the feedback is requested on.

As a further refinement of the above embodiments, we can further reduce the number of wideband vectors to two from 4, which are then represented as $(v_1^{wb}, v_2^{wb})$ for rank-2. Reducing the wideband basis vectors from 4 in the most generic case to 2 is based on the observation that the spatial correlation of the ULA sub-array can be approximated well by the first two dominant eigenvectors in general and is sufficient for rank 2.

We describe another preferred representation of precoder based on above simplifications, which is based on the steps 1) a user feeds back a representation of a first chosen matrix $(v_1^{wb}, v_2^{wb})$ which could be seen as representing the wideband property of the ULA sub-array; and 2) the user may optionally adapt $(v_1^{wb}, v_2^{wb})$ on a subband basis with a rotation codebook $CB_i$, as $v_{nb}^i = f(v_{wb}^i, CB_i)$; 3) the user feeds back a representation of a second matrix of the form of $$\begin{bmatrix} \rho & \sqrt{1-\rho^2} \\ \sqrt{1-\rho^2}\, e^{j\theta_1} & \rho e^{j\theta_2} \end{bmatrix},$$

also as index within a codebook format. The precoder information conveyed by these two representations corresponds to a final precoder matrix defined by one of the three structures below (the user is allowed to select which structure to use)

$$\begin{bmatrix} v_{nb}^1 \rho & v_{nb}^1 \sqrt{1-\rho^2} \\ v_{nb}^1 \sqrt{1-\rho^2} e^{j\theta_1} & v_{nb}^1 \rho e^{j\theta_2} \end{bmatrix}$$

$$\begin{bmatrix} v_{nb}^1 \rho & v_{nb}^2 \sqrt{1-\rho^2} \\ v_{nb}^1 \sqrt{1-\rho^2} e^{j\theta_1} & v_{nb}^2 \rho e^{j\theta_2} \end{bmatrix}$$

$$\begin{bmatrix} v_{nb}^1 \rho & v_{nb}^2 \sqrt{1-\rho^2} \\ v_{nb}^2 \sqrt{1-\rho^2} e^{j\theta_1} & v_{nb}^1 \rho e^{j\theta_2} \end{bmatrix}$$

The above three structures capture three different cases of interaction between ULA spatial components and cross-pol components. Mainly, they correspond approximately to the following three cases i) ULA is strictly rank 1 and cross-pole is used to achieve the rank-2 spatial separation, ii) ULA is highly rank 2 and can be used mainly for spatial separation, and iii) all other cases, where ULA and cross-pole both show rank 2 behavior.

In the first structure, the wireless communication device selecting one column vector of the first matrix. The first sub-precoder matrix associated with two spatial layers is obtained then by multiplying the selected column vector with first and second elements in a first row of the second matrix, and the second sub-precoder matrix associated with two spatial layers is obtained by multiplying the selected column vector with first and second elements in a second row of the second matrix.

In the second structure, the wireless communication device selecting first and second column vectors of the first matrix. The first sub-precoder matrix associated with two spatial layers is obtained by multiplying the first column vector with a first element in a first row of the second matrix and multiplying the second column vector with a second element in a first row of the second matrix, and the second sub-precoder matrix associated with two spatial layers is obtained by multiplying the first column vector with a first element in a first second row of the second matrix and multiplying the second column vector with a second element in a second row of the second matrix.

In the third structure, the wireless communication device selecting first and second column vectors of the first matrix. The first sub-precoder matrix associated with two spatial layers is obtained by multiplying the first column vector with a first element in a first row of the second matrix and multiplying the a second column vector with a second element in a first row of the second matrix, and the second sub-precoder matrix associated with two spatial layers is obtained by multiplying the second column vector with a first element in a first second row of the second matrix and multiplying a the first column vector with a second element in a second row of the second matrix.

The illustration above is based on rank 2 or 2-layer precoding. For rank 1 or one-layer precoding, a similar generalized construction of the final precoder could be $$\begin{bmatrix} v_1 \gamma_1 \\ v_2 \gamma_2 e^{j\theta_1} \end{bmatrix}.$$

A simplified structure that is found to be sufficient for 8 Tx cross-pol antenna configuration rank-1 transmission is $$\begin{bmatrix} v_1^{nb} \\ v_1^{nb} e^{j\theta_1} \end{bmatrix}$$

where $v_{nb}^1 = f(v_{wb}^1, CB_i)$. Similar generalization/construction can be applied to higher ranks using a combination of co-phasing vectors, additional wideband precoder components and additional amplitude scalars.

In other embodiments, we provide further description of the component codebooks, and will use rank 2 for illustration, as similar approach applies to other ranks.

In a preferred embodiment, a product matrix based method of precoder matrix representation can be used to describe the two-component feedback.

First component which describes a wideband codebook is expressed as $$W_1 = \begin{bmatrix} 1 & 1 \\ e^{\frac{2\pi j n_1}{N_1}} & e^{\frac{2\pi j n_2}{N_1}} \\ \ldots & \ldots \\ e^{\frac{2\pi j L n_1}{N_1}} & e^{\frac{2\pi j L n_2}{N_1}} \end{bmatrix}$$

$n_1, n_2 \in \{0, 1, 2, \ldots N_1 = 2^{B_1} - 1\}$ which is essentially to capture $[v_1^{wb} \; v_2^{wb}]$. A different size may be chosen for n1 and n2 and further only particular pairs may be allowed to reduce codebook size. In addition, some non-DFT codebook entries may be added to represent each column.

The second codebook may be represented as one of the three forms:

$$W_2 = \left\{ \begin{bmatrix} 1 & e^{\frac{2\pi j k_1}{4}} & 1 & -e^{\frac{2\pi j k_2}{4}} \\ 0 & 0 & 0 & 0 \end{bmatrix}, \right.$$

or $$\begin{bmatrix} \rho & \sqrt{1-\rho^2} e^{\frac{2\pi j k_1}{4}} & 0 & 0 \\ 0 & 0 & \sqrt{1-\rho^2} & \rho e^{\frac{2\pi j k_2}{4}} \end{bmatrix},$$

or $$\left. \begin{bmatrix} \rho & 0 & 0 & \rho e^{\frac{2\pi j k_2}{4}} \\ 0 & \sqrt{1-\rho^2} e^{\frac{2\pi j k_1}{4}} & \sqrt{1-\rho^2} & 0 \end{bmatrix} \right\},$$

where $\rho^2 \in \{0.5, 0.75, 0.9, 1\}$, $k_1, k_2 \in \{0, 1, 2, 3\}$

The final precoder is obtained as $W = \text{reshape}(W_1 W_2)$ where a "reshaping" operation is to re-arrange the columns of the product matrix to form the precoder matrix. For example, for 8 Tx with a 4-by-2 W and a 2-by-4 $W_2$ and 4-by-4 product matrix can be column-wise reshaped to 8×2 precoder W as follows.

$$\text{reshape}(X = [X_1 X_2 X_3 X_4]) = \begin{bmatrix} X_1 & X_3 \\ X_2 & X_4 \end{bmatrix}$$

A more general "reshaping" operation on a matrix represented as a row of vectors can be defined as follows for higher ranks and arbitrary number of antennas.

$$\text{reshape}([X_1 X_2 X_3 X_4 \ldots X_{N \times M}], N, M) = \begin{bmatrix} X_1 & X_{N+1} & \ldots & X_{(N-1)+1} \\ X_2 & \ldots & & \\ \ldots & \ldots & & \\ X_N & X_{2N} & & X_{NM} \end{bmatrix}$$

In another embodiment, additional joint coding of parameters $\rho$, $k_1$, $k_2$ may be performed to restrict the size of the subband codebook by selecting a subset of combinations enumerated above. Further different entries may also be chosen for the codebook than shown in the embodiment. The three rows in the codebook are chosen to correspond to the three structures for the final precoder matrix. In the first row, the amplitude scalar is set to 1 and co-phasing is reduced to 4 instead of 16, to ensure orthogonality. Similar joint coding can be performed to reduce the entries in other rows corresponding to structures 2 and 3, which may be based on further optimization.

In another embodiment, the subband codebook may be expanded allowing the incorporation of a rotation codebook, in which case the wideband and subband codebook could be represented mathematically as $$W_1 = \left[\text{diag}\left(\begin{bmatrix} 1 & e^{\frac{2\pi j n_1}{N_1}} & \cdots & e^{\frac{2\pi j L n_1}{N_1}} \end{bmatrix}\right), \text{diag}\left(\begin{bmatrix} 1 & e^{\frac{2\pi j n_2}{N_1}} & \cdots & e^{\frac{2\pi j L n_2}{N_1}} \end{bmatrix}\right)\right]$$

$$= \begin{bmatrix} 1 & 0 & \cdots & 0 & 1 & 0 & \cdots & 0 \\ 0 & e^{\frac{2\pi j n_1}{N_1}} & \cdots & 0 & 0 & e^{\frac{2\pi j n_2}{N_1}} & \cdots & 0 \\ 0 & 0 & \cdots & 0 & 0 & 0 & \cdots & 0 \\ 0 & 0 & \cdots & e^{\frac{2\pi j L n_1}{N_1}} & 0 & 0 & \cdots & e^{\frac{2\pi j L n_2}{N_1}} \end{bmatrix}$$

$$n_1, n_2 \in \{0, 1, \ldots N_1 = 2^{B_1} - 1\}$$

$$W_2 = \left\{ \begin{bmatrix} u_1 & 1e^{\frac{2\pi j k_1}{4}} & u_1 & -1e^{\frac{2\pi j k_2}{4}} \\ 0 & 0 & 0 & 0 \end{bmatrix}, \right.$$

or $$\begin{bmatrix} \rho u_1 & \sqrt{1-\rho^2}\, e^{\frac{2\pi j k_1}{4}} u_1 & 0 & 0 \\ 0 & 0 & \sqrt{1-\rho^2}\, u_2 & \rho e^{\frac{2\pi j k_2}{4}} u_2 \end{bmatrix},$$

or $$\left. \begin{bmatrix} \rho u_1 & 0 & 0 & \rho e^{\frac{2\pi j k_2}{4}} u_1 \\ 0 & \sqrt{1-\rho^2}\, e^{\frac{2\pi j k_1}{4}} u_2 & \sqrt{1-\rho^2}\, u_2 & 0 \end{bmatrix} \right\},$$

where $$\rho^2 \in \{0.5, 0.75, 0.9, 1\},$$

$$k_1, k_2 \in \{0, 1, 2, 3\};$$

$$n = -2^{B_2-1} = -N_2/2, -(N_2/2-1), \ldots 0 \ldots, N_2/2 - 1\}$$

where 0, 1 represent Lx1 vectors of zeros and ones respectively.

The construction above presents a product design followed by reshaping to provide improved flexibility in the two component feedback. However, further overhead reduction can be configured by eNB, by enabling codebook subset restrictions at wideband and subband level. A codebook subset restriction is essentially where eNB signals the UE to only use a subset of codebook entries for the feedback. Subset restriction can be applied to either the first codebook, or the second codebook, or both.

Codebook subset restriction can be used for both wideband and subband components in a pre-configured and compatible manner, which we will further describe with some exemplary methods.

In one embodiment, a subset restriction can be imposed at wideband level to only transmit information regarding v1, by defining wideband codebook as follows $$W_1 = \left[\text{diag}\left(\begin{bmatrix} 1 & e^{\frac{2\pi j n_1}{N_1}} & \cdots & e^{\frac{2\pi j L n_1}{N_1}} \end{bmatrix}\right) \text{diag}([1 \ 1 \ \cdots \ 1])\right]$$

With this restriction, only B1 bits of information need to be sent, and may be beneficial when ULA is highly rank 1 as in certain LOS cases, and only structure one may be used for all sub-bands included in the feedback. This would also implicitly result in following restriction for the subband codebook, $$W_2 = \left\{ \begin{bmatrix} u_1 & e^{\frac{2\pi j k_1}{4}} u_1 & -e^{\frac{2\pi j k_2}{4}} \\ 0 & 0 & 0 & 0 \end{bmatrix} \right\},$$

$$k_1, k_2 \in \{0, 1, 2, 3\};$$

$$u_1, u_2 \in CB_{ij} = \left\{\begin{bmatrix} 1 & e^{\frac{2\pi j n}{N_1 K}} & e^{\frac{2\pi j \cdot 2n}{N_1 K}} & \cdots & e^{\frac{2\pi j \cdot Ln}{N_1 K}} \end{bmatrix}^T\right\},$$

$$n = -2^{B_2-1} = -N_2/2, -(N_2/2-1), \ldots 0 \ldots, N_2/2 - 1\}$$

In another embodiment, at subband level, a subset restriction can be imposed to limit to one or more structures.

In another embodiment, a subset restriction can be used to signal wideband value of a parameter. For example, p may be signaled commonly on a wideband basis or as a fixed value common to all codebook entries corresponding to each structure. Similarly, co-phasing may be fixed if structure one is used, so that $k_1 = k_2 = 0$.

In another embodiment, subset restriction can enable/disable further refinement using rotation i.e., $u_1$ and $u_2$ can be set to $[1 \ 1 \ \ldots \ 1]^T$, which corresponds to no rotation of wideband vector.

Additionally, codebook subset restrictions may be imposed in an inter-dependent manner over wideband and subband codebooks. In other words, an UE may receive an UE-specific or cell-specific higher layer subset-restriction parameter which can take a set of multiple values each of which maps to a 'codebook subset' pair for W and $W_2$. The mapping can be pre-defined and known to both the eNB and the UE. The construction of final precoder is simply based on $$W = \text{reshape}(W_1 W_2) \quad (0.12)$$

once the component precoders are chosen from the restricted codebooks.

In general, the subset restriction may be useful under certain persistent long-term conditions like whether link is line of sight (LOS) or non line of sight (NLOS), the eNB antenna configuration if a general codebook is used for all configurations (say ULA/XPOL), UE geometry which could limit the uplink feedback link capacity and iv) additional feedback required for other transmission modes like multiuser MIMO which may provision fewer bits to higher-ranked SU transmission.

The two component feedback scheme described above is applicable to multiple feedback modes as further described below.

Figure 6:
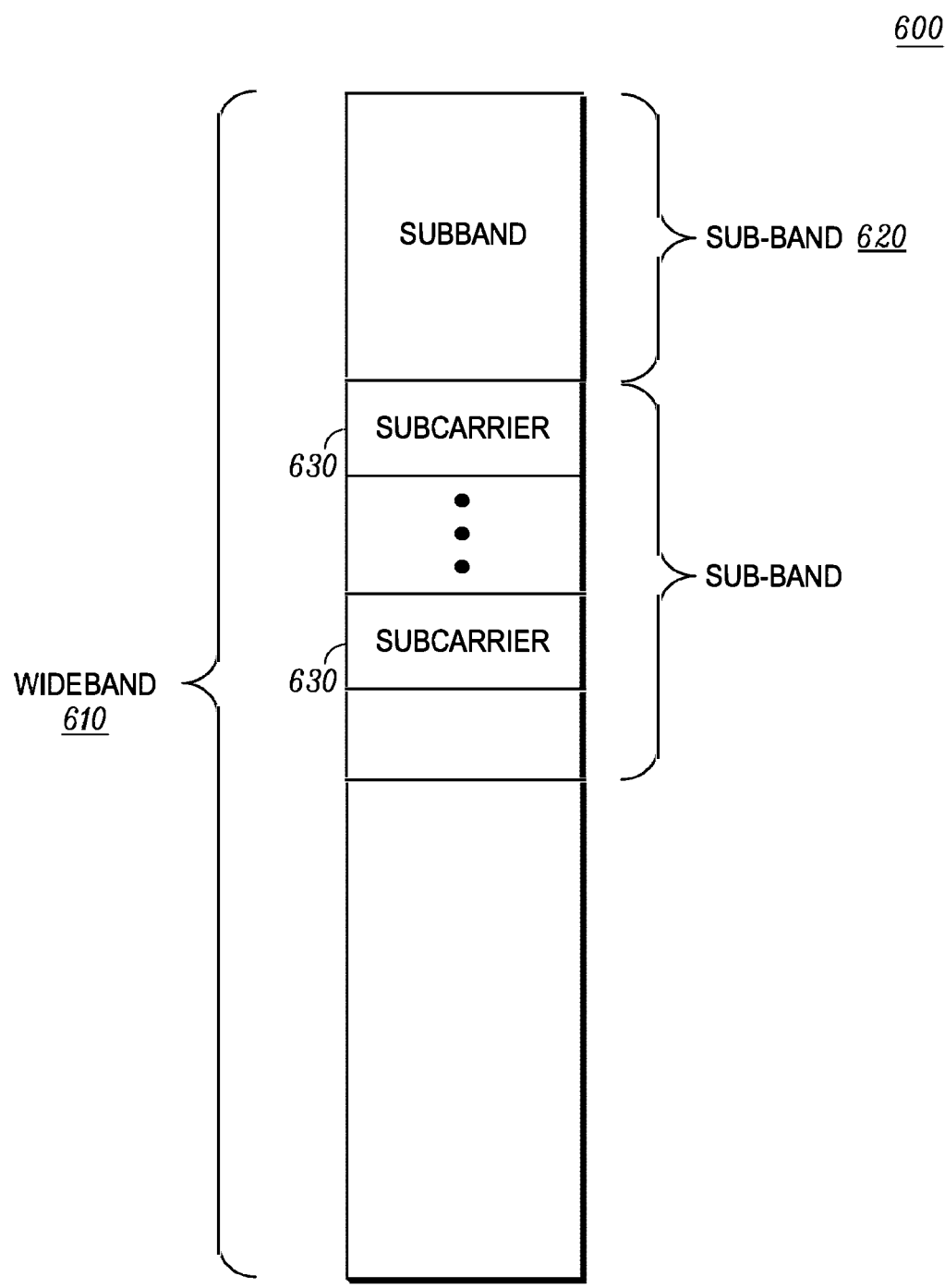
FIG. 6 illustrates a wideband and subbands, each of which is further composed of contiguous subcarriers.

One embodiment is illustrated in FIG. 6. The first component could correspond to a wideband matrix $W_1^{WB}$ corresponding to the whole bandwidth 610, which is composed of one or more sub-bands 620. Each subband 620 is composed of a set of contiguous subcarriers 630 or in LTE, a set of RBs, which is the minimum scheduling/feedback granularity. A second matrix $W_2^b$ corresponds to a to a band V. The precoder for a band represented as $W^b$ is obtained as a function of $W_1^{WB}$ and $W_2^b$. A preferred example of the function as described above is reshape (W1×W2). A UE is required to feedback the wideband precoder/matrix for the whole band and the subband precoder/matrix for each subband.

In one embodiment, the feedback could be defined along with an associated CQI feedback. The CQI feedback could correspond to a modulation and coding scheme (MCS) recommendation and/or a rank indication. The CQI could further consist of multiple CQI, one per each subband. In this case, the UE must select the components $W_1^{WB}$ and $W_2^b$ such that the subband precoders can support the CQI reported corresponding to the subband on the hypothesis UE is allocated that subband, while satisfying an error rate target. In another embodiment, a single CQI may be reported for the whole band, in which case the reported CQI must meet the error rate target, on the hypothesis that the UE is allocated the whole band, and the reported pre-coders are applied on each subband.

In another embodiment, the reported sub-bands may be a subset of the sub-bands that constitute the bandwidth and may or may not be equal in size as defined by number of subcarriers in each subband.

In another embodiment, the sub-bands to be reported may be signaled by the eNB explicitly from a set of predefined patterns.

In another embodiment, the sub-bands 620 may also be selected by the UE. The selection could be based on the best N (N<wholebandwidth) bands with ranking defined based on a performance criterion like sum rate supported or similar.

In another embodiment, the first matrix may be further feedback at different time instances and/or periodicities compared to the second matrix. This can, for example, be useful to alleviate the feedback load on the uplink in a single reporting instance like a subframe. Further, they may also be transmitted on different uplink physical channels like PUSCH and PUCCH defined in the current LTE Release-8.

In the above description, we have extensively used DFT based codebooks as preferred examples. If the antennas at the eNB are not calibrated, it is likely that the phase progression as in a DFT vector assumed for a ULA antenna sub-array may not hold. In the worst case scenario of un-calibrated antennas, the relative phase error between antennas may be random. However, it is also expected they are stable and slowly varying compared to time between feedback intervals. Other errors like relative timing errors between antennas may also introduce a relative phase shift that may not correspond to a ULA array. In such cases, one solution is for the UE to feedback a phase error correction vector relatively infrequently, which can be used to rotate the reported precoder at the eNB.

Further, another approach is to include some non-DFT but constant modulus vectors in the wideband codebook, which can compensate for the relative phase error. Note that the subband codebook may not be changed, since it is a relative rotation with respect to the wideband vector.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication device configured for sending precoder matrix information to a base station, the device comprising:
 a transmitter configured for sending the precoder matrix information to the base station, the precoder matrix information comprising:
  a first representation of a first matrix chosen from a first codebook and a second representation of a second matrix chosen from a second codebook, the first matrix having at least two column vectors, the first representation and the second representation together conveying a precoder matrix of one or more vectors associated with one or more spatial layers; and
  the precoder matrix comprising a first sub-precoder matrix including a first set of weights on a first subset of transmit antennas of the base station and a second sub-precoder matrix including a second set of weights on a second subset of transmit antennas of the base station, the first and the second subsets of transmit antennas of the base station being non-overlapping, the first sub-precoder matrix and the second sub-precoder matrix comprising one or more column vectors of the first matrix corresponding to the first representation multiplied by one or more entries of the second matrix corresponding to the second representation.

2. The wireless communication device of claim 1, wherein the at least two column vectors are different.

3. The wireless communication device of claim 1, wherein the first representation is an index of the first chosen matrix from the first codebook.

4. The wireless communication device of claim 1, wherein the second representation is an index of the second chosen matrix from the second codebook.

5. The wireless communication device of claim 1, wherein the first codebook includes a set of matrices whose column vectors are Discrete Fourier Transform (DFT) vectors.

6. The wireless communication device of claim 1, wherein the second matrix has at least two entries that have different and non-zero amplitude.

7. The wireless communication device of claim 1, wherein the second matrix has a same vector norm for each row of the second matrix.

8. The wireless communication device of claim 1, wherein the second matrix has a same vector norm for each column of the second matrix.

9. The wireless communication device of claim 1, wherein the second matrix comprises entries that are co-phasing factors associated with the first sub-precoder matrix and the second sub-precoder matrix.

10. The wireless communication device of claim 9, wherein the co-phasing factors are based on a Discrete Fourier Transform (DFT) codebook.

11. The wireless communication device of claim 1, wherein the wireless communication device is further configured for selecting one column vector of the first matrix, wherein the first sub-precoder matrix is associated with one spatial layer and the first sub-precoder matrix is obtained by multiplying the selected column vector with a first element in a first row of the second matrix, and wherein the second sub-precoder matrix is associated with one spatial layer and the second sub-precoder matrix is obtained by multiplying the selected column vector with a first element in a second row of the second matrix.

12. The wireless communication device of claim 1, wherein the wireless communication device is further configured for selecting one column vector of the first matrix, wherein the first sub-precoder matrix is associated with two spatial layers and the first sub-precoder matrix is obtained by multiplying the selected column vector with first and second elements in a first row of the second matrix, and wherein the second sub-precoder matrix is associated with two spatial layers and the second sub-precoder matrix is obtained by multiplying the selected column vector with first and second elements in a second row of the second matrix.

13. The wireless communication device of claim 1, wherein the wireless communication device is further configured for selecting first and second column vectors of the first matrix, wherein the first sub-precoder matrix is associated with two spatial layers and the first sub-precoder matrix is obtained by multiplying the first column vector with a first element in a first row of the second matrix and multiplying the second column vector with a second element in a first row of the second matrix, and wherein the second sub-precoder matrix is associated with two spatial layers and the second sub-precoder matrix is obtained by multiplying the first column vector with a first element in a second row of the second matrix and multiplying the second column vector with a second element in a second row of the second matrix.

14. The wireless communication device of claim 1, wherein the wireless communication device is further configured for selecting first and second column vectors of the first matrix, wherein the first sub-precoder matrix is associated with two spatial layers and the first sub-precoder matrix is obtained by multiplying the first column vector with a first element in a first row of the second matrix and multiplying the second column vector with a second element in a first row of the second matrix, and wherein the second sub-precoder matrix is associated with two spatial layers and the second sub-precoder matrix is obtained by multiplying the second column vector with a first element in a second row of the second matrix and multiplying the first column vector with a second element in a second row of the second matrix.

15. The wireless communication device of claim 1, wherein the wireless communication device is further configured for:
   forming an alternative form of the second matrix from entries of the second matrix;
   obtaining a product matrix from multiplication of the first matrix and the alternative form of the second matrix; and
   obtaining the precoder matrix performed by mapping columns of the product matrix to the first and second sub-precoder matrix.

16. The wireless communication device of claim 15, wherein the alternative form of the second matrix is obtained by mapping entries of the second matrix such that one entry is present in each column of the alternative form of the second matrix with remaining entries of each column being zero.

17. The wireless communication device of claim 1, wherein the wireless communication device is further configured for rotating at least one vector of the first matrix according to a rotation matrix selected from a rotation codebook.

18. The wireless communication device of claim 17, wherein the rotation codebook is a Discrete Fourier Transform (DFT) codebook.

19. The wireless communication device of claim 17, wherein the wireless communication device is further configured for rotating at least one column vector of the first matrix according to a rotation matrix chosen from a rotation codebook, wherein the rotation matrix corresponds to a sub-band.

20. The wireless communication device of claim 1, wherein the first matrix is chosen from a subset of the first codebook.

21. The wireless communication device of claim 1, wherein the second matrix is chosen from a subset of the second codebook.

22. The wireless communication device of claim 1, wherein the wireless communication device is further configured for determining a number of column vectors in the precoder matrix, the number of column vectors corresponding to a number of the one or more spatial layers.

23. The wireless communication device of claim 1, wherein the first matrix corresponds to a frequency band, the second matrix corresponds to a frequency sub-band within the frequency band, the first representation and the second representation together convey the precoder matrix of one or more vectors associated with the one or more spatial layers, and the precoder matrix corresponds to the frequency sub-band.

24. A method of precoding at a base station based on feedback from a wireless communication device, the method comprising:
   receiving feedback conveying a recommended precoder from the wireless communication device, the feedback comprising a first representation of a first matrix chosen from a first codebook and a second representation of a second matrix chosen from a second codebook, the first matrix having at least two column vectors, the first representation and the second representation together conveying a precoder matrix of one or more vectors associated with one or more spatial layers;
   constructing a final precoder as a function of the received feedback;
   precoding at least one data stream using the final precoder; and
   transmitting the at least one data stream from the base station to the mobile communication device.

25. The method of claim 24, wherein the at least two column vectors are different.

26. The method of claim 24, wherein the first representation is an index of the chosen matrix in the first codebook.

27. The method of claim 24, wherein the second representation is an index of the chosen matrix in the second codebook.

28. The method of claim 24, wherein the first codebook includes a set of matrices whose column vectors are Discrete Fourier Transform (DFT) vectors.

29. The method of claim 24, wherein the second matrix has at least two entries that have different and non-zero amplitude.

30. The method of claim 24, wherein the precoder matrix comprises a first sub-precoder matrix including a first set of weights on a first subset of transmit antennas of the base station and a second sub-precoder matrix including a second set of weights on a second subset of transmit antennas of the base station, the first and the second subsets of transmit antennas of the base station being non-overlapping, the first sub-precoder matrix and the second sub-precoder matrix comprising one or more column vectors of the first matrix corresponding to the first representation multiplied by one or more entries of the second matrix corresponding to the second representation.

31. The method of claim 30, wherein the second matrix comprises entries that are co-phasing factors associated with the first sub-precoder matrix and the second sub-precoder matrix.

* * * * *